United States Patent
Steif et al.

(10) Patent No.: US 9,569,761 B2
(45) Date of Patent: Feb. 14, 2017

(54) TEXT-TO-PAY FOR A NEW SUBSCRIPTION

(71) Applicant: BOKU, INC., San Francisco, CA (US)

(72) Inventors: Daniel Steif, San Francisco, CA (US); Kurt Davis, San Francisco, CA (US); Katherine Ann Corner, San Francisco, CA (US); Samantha Elena Nebrich, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 14/491,435

(22) Filed: Sep. 19, 2014

(65) Prior Publication Data

US 2015/0088711 A1     Mar. 26, 2015

Related U.S. Application Data

(60) Provisional application No. 61/880,713, filed on Sep. 20, 2013.

(51) Int. Cl.
| | |
|---|---|
| *G06Q 20/14* | (2012.01) |
| *G06Q 20/32* | (2012.01) |
| *H04M 15/00* | (2006.01) |
| *G06Q 20/12* | (2012.01) |
| *G06Q 20/16* | (2012.01) |

(52) U.S. Cl.
CPC ............ *G06Q 20/14* (2013.01); *G06Q 20/123* (2013.01); *G06Q 20/16* (2013.01); *G06Q 20/3255* (2013.01)

(58) Field of Classification Search
CPC ........ G06Q 40/10; G06Q 40/02; G06Q 20/14; H04M 15/00

USPC .......................................... 705/30, 40, 44, 33
See application file for complete search history.

(56) References Cited

U.S. PATENT DOCUMENTS

| | | | | |
|---|---|---|---|---|
| 5,835,856 | A  * | 11/1998 | Patel | 455/406 |
| 7,079,524 | B2 * | 7/2006 | Bantukul et al. | 370/349 |
| 8,744,971 | B2 | 6/2014 | Chen et al. | |
| 8,825,532 | B1 | 9/2014 | Wong | |
| 9,003,078 | B2 * | 4/2015 | Browne | G06Q 20/145 710/33 |
| 2001/0056354 | A1 * | 12/2001 | Feit et al. | 705/1 |
| 2004/0143523 | A1 * | 7/2004 | Pegaz-Paquet et al. | 705/34 |
| 2004/0203943 | A1 * | 10/2004 | Cai et al. | 455/466 |
| 2004/0267663 | A1 | 12/2004 | Karns et al. | |
| 2006/0218091 | A1 | 9/2006 | Choy | |
| 2006/0281492 | A1 * | 12/2006 | Jiang | H04Q 3/0025 455/558 |
| 2007/0054678 | A1 * | 3/2007 | Doulton | 455/466 |
| 2007/0077921 | A1 * | 4/2007 | Hayashi et al. | 455/414.1 |
| 2007/0220565 | A1 * | 9/2007 | Angel et al. | 725/87 |

(Continued)

*Primary Examiner* — Oluseye Iwarere
(74) *Attorney, Agent, or Firm* — Stephen M. De Klerk

(57) ABSTRACT

A code is communicated between the billing server and subscription server. The billing server receives a code request text message from the user device. The billing server identifies a carrier server from the code request text message. The billing server receives an authorization text message from the user device in response to an authorization request text message and charges an account of the carrier server that has been identified. If the charge has been successful, then the billing server transmits a code redemption text message to the user device including the code and a link to a redemption page of a website of a subscription server. The subscription server processes redemption to a code and transmits an account set up page to the user device.

16 Claims, 26 Drawing Sheets

(56) References Cited

U.S. PATENT DOCUMENTS

| | | | |
|---|---|---|---|
| 2007/0287413 A1* | 12/2007 | Kleitsch et al. | 455/405 |
| 2008/0101370 A1* | 5/2008 | Marsico | H04L 51/14 370/392 |
| 2008/0319823 A1* | 12/2008 | Ahn et al. | 705/10 |
| 2009/0043642 A1* | 2/2009 | Block et al. | 705/10 |
| 2009/0081989 A1* | 3/2009 | Wuhrer | 455/406 |
| 2009/0089116 A1 | 4/2009 | Quirk et al. | |
| 2011/0217994 A1 | 9/2011 | Hirson et al. | |
| 2011/0238545 A1* | 9/2011 | Fanaian | G06Q 30/02 705/34 |
| 2013/0217361 A1* | 8/2013 | Mohammed | H04W 12/06 455/411 |
| 2014/0279455 A1* | 9/2014 | Browne | G06Q 20/145 705/40 |
| 2014/0279456 A1* | 9/2014 | Browne | G06Q 20/145 705/40 |
| 2014/0289036 A1* | 9/2014 | Aurigemma | 705/14.42 |
| 2015/0006372 A1* | 1/2015 | Browne | G06Q 20/16 705/40 |
| 2015/0006381 A1* | 1/2015 | Browne | G06Q 20/322 705/44 |
| 2015/0058221 A1* | 2/2015 | Corner | H04M 15/68 705/44 |
| 2015/0127503 A1* | 5/2015 | Steif | G06Q 30/04 705/34 |
| 2015/0127532 A1* | 5/2015 | Steif | G06Q 20/14 705/40 |

\* cited by examiner

| User Name | Password | Delivery Address | Subscription ID | Expiration |
|---|---|---|---|---|
| User Name 1 | Password 1 | Delivery Address 1 | Subscription ID 1 | Expiration 1 |
| User Name 2 | Password 2 | Delivery Address 2 | Subscription ID 2 | Expiration 2 |
| User Name 3 | Password 3 | Delivery Address 3 | Subscription ID 3 | Expiration 3 |
| User Name 4 | Password 4 | Delivery Address 4 | Subscription ID 4 | Expiration 4 |
| User Name 5 | Password 5 | Delivery Address 5 | Subscription ID 5 | Expiration 5 |
| User Name 6 | Password 6 | Delivery Address 6 | Subscription ID 6 | Expiration 6 |

FIG. 3

| User Name | Password | Delivery Address | Subscription ID | Expiration |
|---|---|---|---|---|
| User Name 1 | Password 1 | Delivery Address 1 | Subscription ID 1 | Expiration 1 |
| User Name 2 | Password 2 | Delivery Address 2 | Subscription ID 2 | Expiration 2 |
| User Name 3 | Password 3 | Delivery Address 3 | Subscription ID 3 | Expiration 3 |
| User Name 4 | Password 4 | Delivery Address 4 | Subscription ID 4 | Expiration 4 |
| User Name 5 | Password 5 | Delivery Address 5 | Subscription ID 5 | Expiration 5 |
| User Name 6 | Password 6 | Delivery Address 6 | Subscription ID 6 | Expiration 6 |
| User Name 7 | Password 7 | Delivery Address 7 | Subscription ID 7 | Expiration 7 |

| 15:27 | | |
|---|---|---|
| New Account | | |
| Create User Name: Frank12 | | |
| Create Password: ******** | | |
| Submit | | |
| 1 | 2 ABC | 3 DEF |
| 4 GHI | 5 JKL | 6 MNO |
| 7 PQRS | 8 TUV | 9 WXYZ |
| | 0 | ⌫ |

FIG. 8

| 15:27 | | |
|---|---|---|
| Enter Redemption Code for 1 year subscription to Nomo | | |
| 72P6 | | |
| Submit | | |
| 1 | 2 ABC | 3 DEF |
| 4 GHI | 5 JKL | 6 MNO |
| 7 PQRS | 8 TUV | 9 WXYZ |
| | 0 | ⌫ |

FIG. 7

Nomo Magazine

| | |
|---|---|
| Name: | Joe Reynolds |
| Email: | joe@anmail.com |
| Street / P.O. Box: | P.O. Box 190725 |
| City: | San Francisco |
| State: | California |
| ZIP: | 94119 |

Your mobile number will automatically be charged the Nomo Magazine subscription fee of US $9.99 per month, until you cancel. We will send you a reminder before your mobile number is charged. You can cancel at any time.

Please enter the PIN code.

PIN code: 9810

Nomo Magazine: $9.99/month after trial period

Confirm

Powered by
Billing Server

This is a SUBSCRIPTION service. Subscription charges will renew automatically until cancelled by contacting Billing Server. Customer Support 888-986-4223, www.billingserver.com. Purchase history: www.billingserver.com/cscp. Charges must be authorized by the account holder and will be applied to your wireless bill. Msg&Data rates may apply. By clicking or pressing "CONFIRM", you confirm that you're the wireless account owner or have authorization from the account owner to make purchases, are at least 18 years old or at least 13 years old and have your parent's authorization to make purchases, and agree to the Billing Server's Terms of Use (www.billingserver.com/terms). Privacy Policy: www.billingserver.com/privacy.

FIG. 21

Overview  Premium  Unlimited  Free  E-card

Receipt

| | |
|---|---|
| Order Number | 11754933940015 |
| Date | 2013-01-14 |
| Payment method | MOBILE 415-123-4567 |
| Email | joe@anmail.com |
| Retailer | Nomo Magazine |
| VAT number | 80-0555431 |

This account will automatically continue as a Nomo Magazine subscription billed monthly for $9.99/month until cancelled. Your subscription will automatically renew and you will be charged $9.99 on 2013-02-14 unless you cancel your recurring payment.

A receipt will be sent to your email.

This is a SUBSCRIPTION service. Subscription charges will renew automatically until cancelled by contacting Billing Server. Customer Support 888-986-4223, www.billingserver.com. Purchase history: www.billingserver.com/cscp. Charges must be authorized by the account holder and will be applied to your wireless bill. Msg&Data rates may apply. By clicking or pressing "CONFIRM", you confirm that you're the wireless account owner or have authorization from the account owner to make purchases, are at least 18 years old or at least 13 years old and have your parent's authorization to make purchases, and agree to the Billing Server's Terms of Use (www.billingserver.com/terms). Privacy Policy: www.billingserver.com/privacy.

FIG. 22

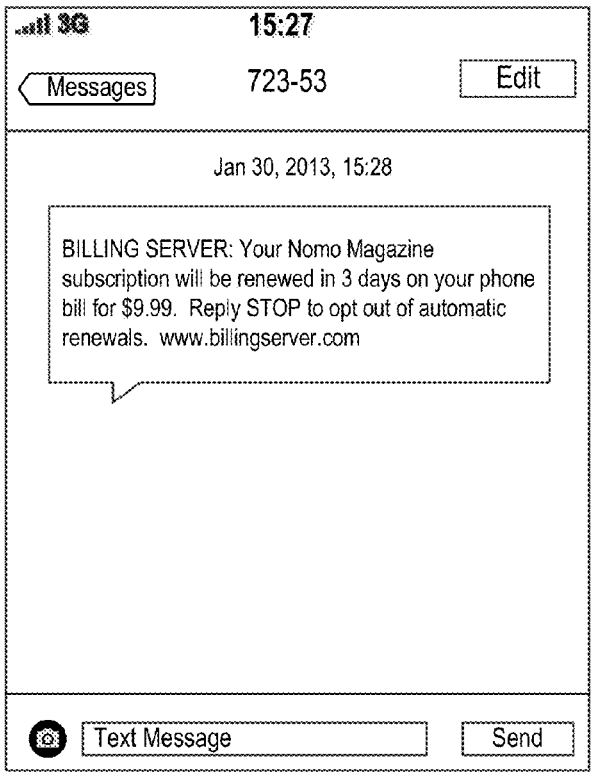
FIG. 25
FIG. 26
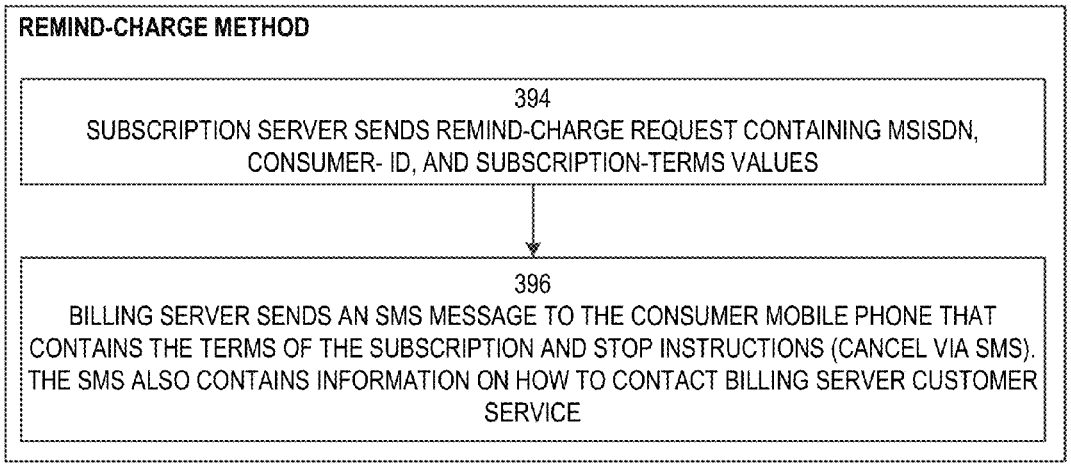

TEXT-TO-PAY FOR A NEW SUBSCRIPTION

CROSS-REFERENCE TO RELATED APPLICATIONS

This nonprovisional application claims priority from U.S. Provisional Patent Application No. 61/880,713, filed on Sep. 20, 2013, all of which is incorporated herein by reference.

BACKGROUND OF THE INVENTION

1). Field of the Invention

This invention relates to a method and system of processing a sale of a subscription.

2). Discussion of Related Art

Magazine publishers normally rely on traditional payment methods to establish or renew subscriptions for their publications. A user may for example purchase a magazine off the shelf in a store. A postcard is often located within the magazine. The user can enter their delivery address on the postcard and send the postcard to the publisher together with a check for payment. After a period of time, typically twelve months, the user is sent a renewal notification, which the user then returns to the publisher with another check.

Users may also register for subscription on a publisher website. The publisher website will collect delivery address information from the user and receive payment by credit card.

The establishment of an account may be a barrier for most users. Frequently, a user will not purchase a magazine or will not go online on a publisher website because of the amount of effort that is involved in terms of time and the number of fields that have to be filled out. Even after the user has purchased the magazine or they have gone online, the initial effort of entering delivery address information may be too much for some users and they may terminate the process of establishing an account, which results in them not being converted into subscription customers.

A consumer who shops for goods or services online may often be given the option to use a selection of payment sources during checkout, such as payment by credit card, debit card, payment from an account held by an institution, or to charge for a purchase on their phone bill. When the consumer selects to charge to their phone bill, a merchant server instructs a billing server which is aligned with a carrier server to carry out the charge. The billing server usually communicates with a consumer mobile phone to confirm the charge before placing the charge on the phone bill at the carrier server.

Consumers also purchase subscriptions online, typically for services such as music or movies, and then make repeat payments on a monthly or other billing cycle. These subscriptions are usually charged directly to a credit card account held by a financial institution. Repeated communications with the consumer to confirm each renewal charge is not required in such a situation. However, if such a charge is submitted by a merchant server to a carrier server, the carrier server typically has a requirement to confirm the charge with the consumer mobile phone. A billing cycle may go by wherein the consumer has neglected to confirm the charge, in which case the subscription would be lost to the merchant.

SUMMARY OF THE INVENTION

The invention provides a method of processing a sale of a subscription including communicating a code between a subscription server and a billing server, the billing server receiving a first text message from a user device of a user, the first text message being a request for a code, and transmitting a second text message to the user device, the second text message including the code and a link to a redemption page of a website of the subscription server, receiving, with the subscription server, a request from the user device when the user selects the link for a redemption page, transmitting, with the subscription server, the redemption page to the user device, the redemption page having a field for the user to enter the code for transmission to the subscription server, receiving a code entered in to the redemption page from a user device of a user, processing, with the subscription server, a redemption of the code received from the user device, wherein the redemption of the code includes determining whether the code received from the user device matches the code communicated between the billing server and the subscription server, if the code received from the user device matches the code communicated between the billing server and the subscription server then transmitting, with the subscription server, at least one account setup page that includes account creation fields to the user device, receiving, with the subscription server, account details from the user device that the user has entered into the account creation fields and storing, with the subscription server, the account details in an account database of the subscription server.

The invention also provides a non-transitory computer readable medium having stored thereon a set of instructions which, when executed by at least one processor, performs a method of processing a sale of a subscription including communicating a code between a subscription server and a billing server, the billing server receiving a first text message from a user device of a user, the first text message being a request for a code, and transmitting a second text message to the user device, the second text message including the code and a link to a redemption page of a website of the subscription server, receiving, with the subscription server, a request from the user device when the user selects the link for a redemption page, transmitting, with the subscription server, the redemption page to the user device, the redemption page having a field for the user to enter the code for transmission to the subscription server, receiving a code entered in to the redemption page from a user device of a user, processing, with the subscription server, a redemption of the code, wherein the redemption of the code includes determining whether the code received from the user device matches the code communicated between the billing server and the subscription server, if the code received from the user device matches the code communicated between the billing server and the subscription server then transmitting, with the subscription server, at least one account setup page that includes at account creation fields to the user device; receiving, with the subscription server, account details from the user device that the user has entered into the account creation fields and storing, with the subscription server, the account details in an account database of the subscription server.

The invention further provides a subscription server system comprising a subscription server that includes a processor, a computer-readable medium connected to the processor and a set of instructions on the computer-readable medium being executable by the processor to carry out a method of processing a sale of a subscription including a code issuing module communicating a code between a subscription server and a billing server, the billing server receiving a first text message from a user device of a user, the first text message being a request for a code, and transmitting a second text message to the user device, the second text message including the code and a link to a redemption page of a website of the subscription server, a website, an account database, a user device interactive module receiving a request from the user device when the user selects the link for a redemption page, and transmitting the redemption page from the mobile website to the user device, the redemption page having a field for the user to enter the code for transmission to the subscription server, and receiving a code entered in to the redemption page from a user device of a user, a code redemption module processing a redemption of the code received from the user device, wherein the redemption of the code includes determining whether the code received from the user device matches the code communicated between the billing server and the subscription server, wherein if the code received from the user device matches the code communicated between the billing server and the subscription server then the user device interactive module transmits at least one account setup page that includes at account creation fields to the user device, receives account details from the user device that the user has entered into the account creation fields and stores the account details in the account database.

BRIEF DESCRIPTION OF THE DRAWINGS

The invention is further described by way of example with reference to the accompanying drawings, wherein:

FIG. 3 shows accounts that are stored within an account database of the subscription server of the subscription management system;

FIG. 7 is a view similar to FIG. 6 when the user mobile phone is used to enter a redemption code;

FIG. 8 is a view similar to FIG. 7 when the user mobile phone is used to enter account information;

FIG. 9 is a view similar to FIG. 8 wherein the user mobile phone is used to enter further account information;

FIG. 10 is a view similar to FIG. 3 illustrating the creation of an additional account;

FIG. 21 is a view of the user interface for the user to enter a PIN code;

FIG. 22 is a view of the user interface that is displayed at the user mobile phone to indicate that the PIN code has been validated and that the subscription is now available to the user account on the subscription server;

FIG. 25 shows a text message that is received by the user mobile phone with a reminder that a first charge is due to occur based on the subscription;

FIG. 26 is a flow chart of a remind-charge method that is used for the subscription server to cause the billing server to transmit the text message of FIG. 25;

DETAILED DESCRIPTION OF THE INVENTION

Figure 1:
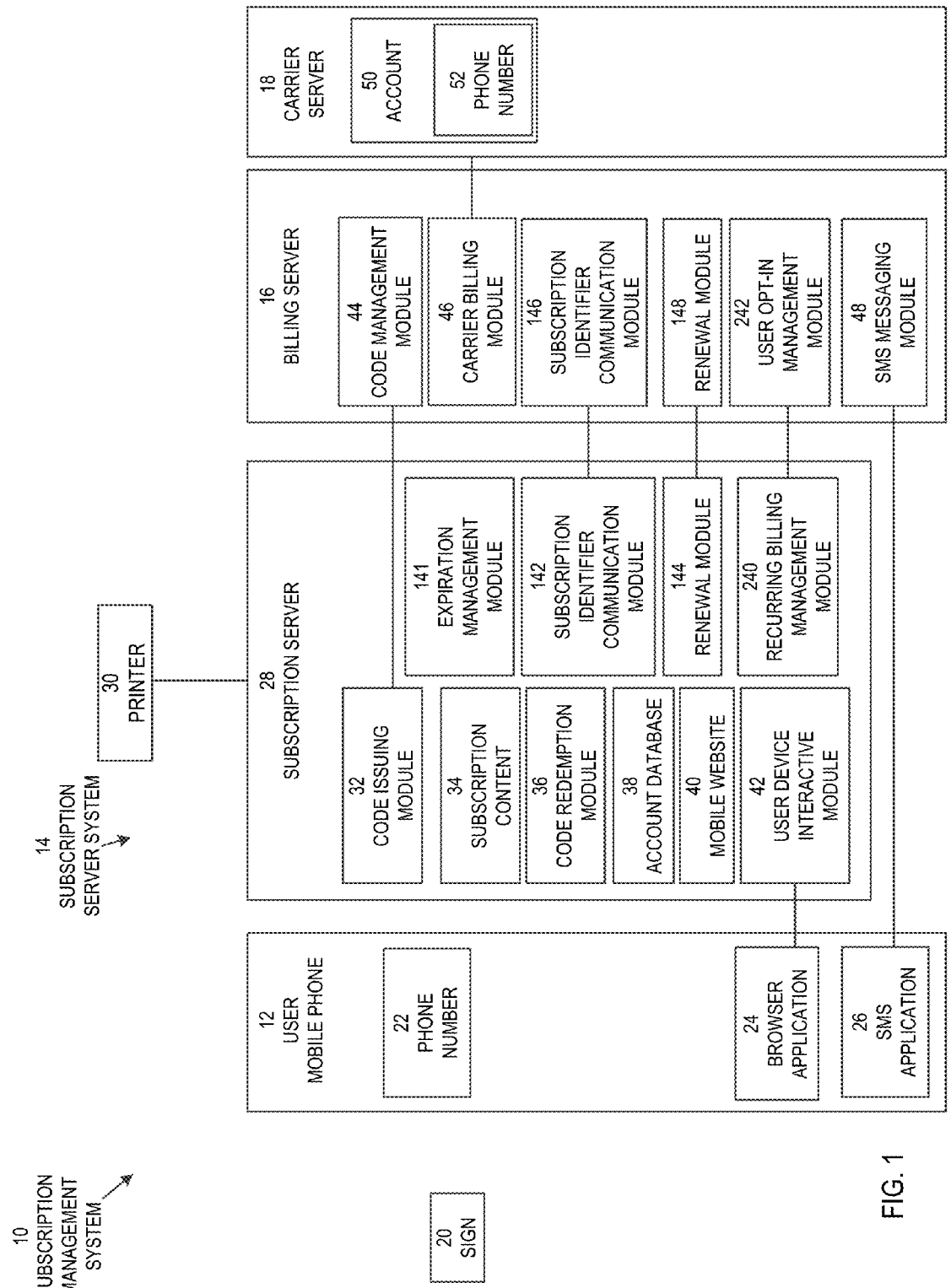
FIG. 1 is a block diagram of a subscription management system according to an embodiment of the invention.

FIG. 1 of the accompanying drawings illustrates a subscription management system 10 including a user mobile phone 12, a subscription server system 14, a billing server 16 and a carrier server 18 interacting with one another. The user mobile phone 12 is connected over the Internet to the subscription server system 14 and over a Short Message Service (SMS) network to the billing server 16. The subscription server system 14 is connected over the Internet to the billing server 16. The billing server 16 is connected over the Internet to the carrier server 18.

The subscription management system 10 further includes a sign 20 that is located in a region of the user mobile phone 12 so that a user of the user mobile phone 12 can read the sign 20.

The user mobile phone 12 includes a phone number 22 that is stored in memory, a browser application 24 that is executable by the processor of the user mobile phone 12 and an SMS application 26 that is executable by a processor of the user mobile phone 12. The phone number 22 is in the form of a standardized mobile subscriber integrated services digital subscriber number (msisdn).

The subscription server system 14 includes a subscription server 28 and a printer 30 connected to the subscription server 28. The subscription server 28 includes a code issuing module 32, subscription content 34, a code redemption module 36, an account database 38, a mobile website 40 and a user device interactive module 42. The components 32 to 42 are all connected to one another and share data with one another. The user device interactive module 42 is connected over the Internet to the browser application 24 of the user mobile phone 12.

The billing server 16 includes a code management module 44, a carrier billing module 46 and an SMS messaging module 48. The code management module 44 is connected over the Internet to the code issuing module 32. The SMS messaging module 48 is connected over the SMS network to the SMS application 26 of the user mobile phone 12.

The carrier server 18 includes a data store with a plurality of accounts 50. Each account 50 is identified by respective phone number 52.

Figure 2:
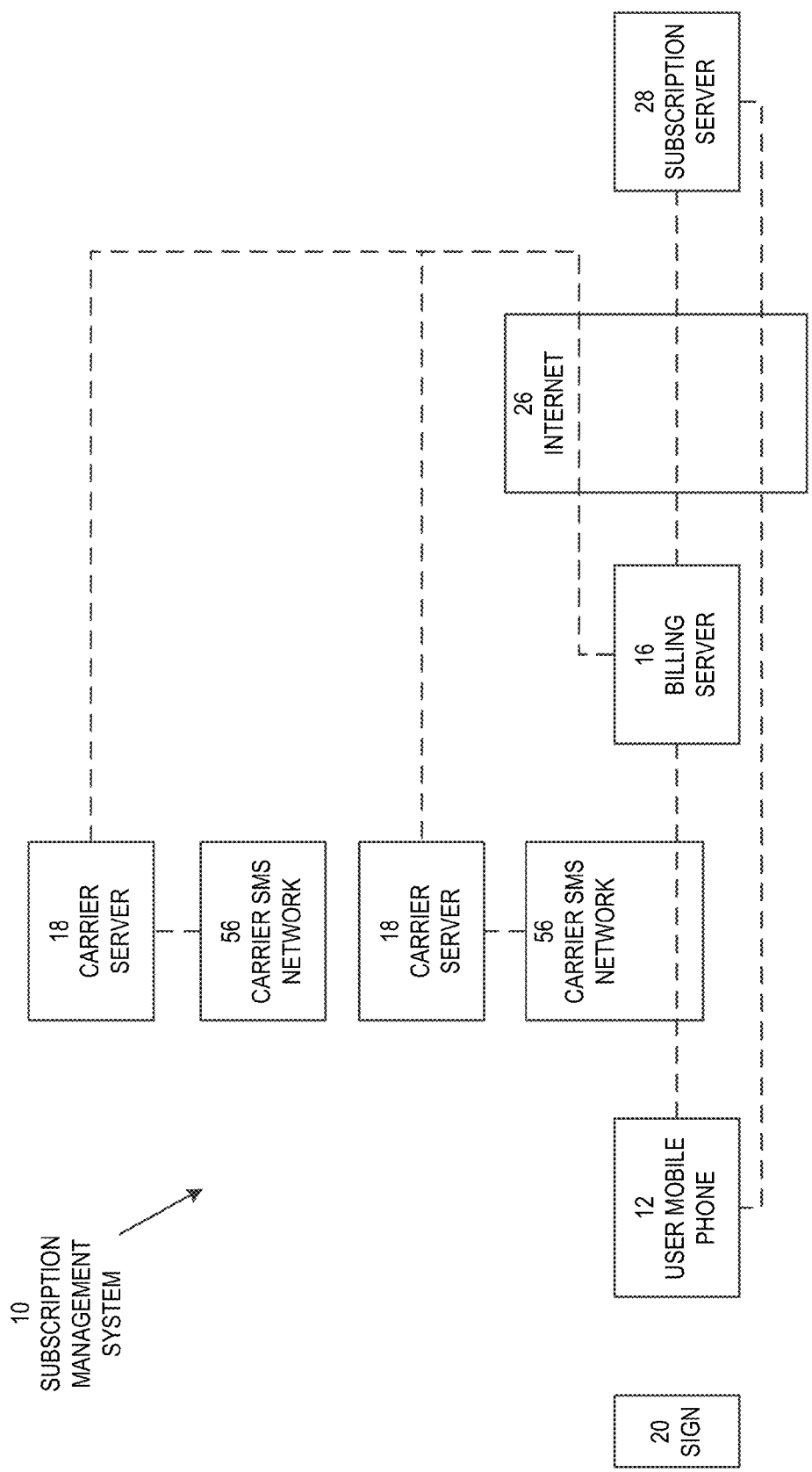
FIG. 2 is a block diagram of the subscription management system illustrating carrier networks in more detail.

As further shown in FIG. 2, a plurality of carrier servers 18 exist within the subscription management system 10. Each carrier server 18 has a respective carrier SMS network 56 associated therewith. The user mobile phone 12 belongs to the carrier SMS network 56 of one of the carrier servers 18. When a text message is transmitted from the user mobile phone 12, the text message is appended with the phone number 22 in FIG. 1 so that the billing server 16 receives the phone number. The respective carrier server 18 of the respective carrier SMS network 56 through which the text message travels also appends a carrier identifier to the text message. The billing server 16 can thus identify the respective carrier server 18 based on the carrier identifier that has been appended to the text message. The billing server 16 can then send a charge request to the respective carrier server 18 having the carrier identifier and request charging of an account having the phone number 22 of the user mobile phone 12. Referring again to FIG. 1, the account 50 at the carrier server 18 having a phone number 52 matching the phone number 22 of the user mobile phone 12 is charged.

FIG. 3 illustrates contents of the account database 38 of the subscription server 28 in more detail. In the example, six accounts have been established, each with a respective user name, password, delivery address, subscription identifier and expiration. The user names and passwords are all unique, thus allowing a user to log into their respective account. The delivery address is a physical address to which a physical magazine can be mailed. The delivery address may for example be a street address or a P.O. Box address. The subscription identifiers are assigned by the subscription server 28 when accounts are opened and are all unique. The expirations are past or future dates that have been calculated for when a subscription expires. For example, if a twelve month subscription is purchased on Sep. 2, 2013 then the expiration would be Sep. 2, 2014. The user will then receive twelve monthly issues or fifty-two weekly issues, depending on how frequently a magazine is published.

Figure 4:
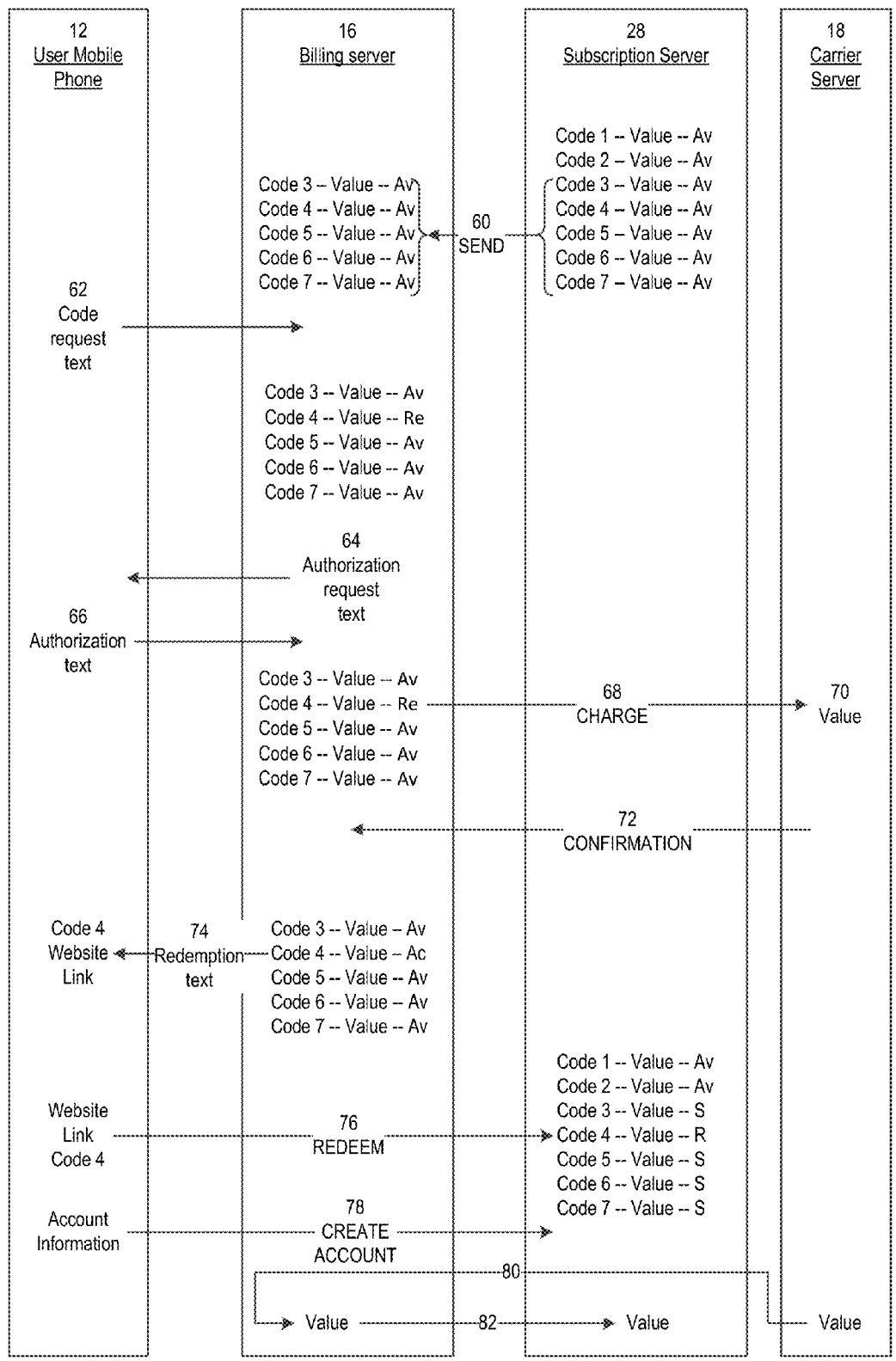
FIG. 4 is an interactive diagram illustrating functioning of various systems within the subscription management system.

Referring to FIG. 4, the subscription server 28 holds a plurality of codes, in the example codes 1 to 7. Each code may have a value associated therewith. Each code is marked as being available (Av). At 60, the subscription server 28 sends a subset of the codes to the billing server 16. The billing server 16 stores the subset of codes, together with their respective values and each code is marked as being available.

Figure 5:
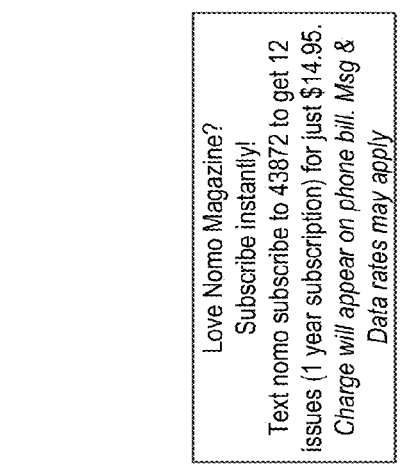
FIG. 5 is a view of a sign that is displayed for advertising a subscription.

Referring to FIG. 5, a user of the user mobile phone 12 may view a sign 20 having an advertisement for a magazine subscription. In the present example, the user is invited to send an SMS text message to a short code to receive twelve issues, namely a one year subscription, for an amount. As shown in FIG. 4, at 62, the user sends a code request text message to the billing server 16. As mentioned with respect to FIGS. 1 and 2, the code request text message includes the phone number 22 of the user mobile phone 12 and the carrier identifier of the respective carrier server 18.

The billing server 16 then marks one of the codes as being reserved (Re). The billing server 16 at 64 sends an authorization request text message to the user mobile phone 12. The authorization request text message requests that the user respond with an authorization text message and states that the user will receive a subscription according to the sign 20 in FIG. 5. At 66, the user responds to the authorization request text message transmitted at 64 by returning an authorization text message to the billing server 16.

When the billing server 16 receives the authorization text message transmitted at 66, the billing server 16 attempts to place a charge on the carrier server 18. In the present example the billing server 16 at 68 transmits a charge request to the carrier server 18 that includes an amount for the value of the code and the phone number 22 of the user mobile phone 12. The carrier server 18 then attempts to place a charge for a value 70 corresponding to the value of the code on an account corresponding to the phone number 22 of the user mobile phone 12. If the carrier server 18 successfully places the charge then the carrier server 18 at 72 returns a confirmation to the billing server 16. If the carrier server 18 does not place the charge, for example due to restrictions on the account, then the carrier server 18 will return a fail notification to the billing server 16 instead of the confirmation 72. The billing server 16 will then not transmit the code to the user mobile phone 12. The billing server 16 will again mark the relevant code that has previously been marked as reserved as being available. The billing server 16 will not take any of the further actions shown in FIG. 4.

If the billing server 16 receives the confirmation 72, then, at 74, the billing server 16 transmits a redemption text to the user mobile phone 12. The redemption text transmitted at 74 includes the relevant code, in the example code 4, and a website link that the user can select to request a page from the subscription server 28. When the selects the website link, the user mobile phone 12 requests redemption page from the mobile website 40 (FIG. 1) of the subscription server 28. The subscription server 28 responds to the request by returning a redemption page to the user mobile phone 12. The redemption page is opened within the browser application 24 (FIG. 1) of the user mobile phone 12. The user can then enter a code, which is the same code as the code transmitted at 74, into the redemption page in order to redeem the code. At 76, the code is redeemed at the subscription server 28. If the code is successfully redeemed, then the code is marked as having been redeemed (R) at the subscription server 28. If the code that is received at 76 does not match any of the codes within the subscription server 28, then no code is redeemed within the subscription server 28.

Once the code has been redeemed at 76, the subscription server 28 permits the creation of an account. At 78, the user at the user mobile phone 12 enters account information for purposes of creating a new account within the subscription server 28. The carrier server 18 places a value for the charge for the value 70 on a phone bill of the user of the user mobile phone 12. After the user has paid their phone bill, the carrier server 18 at 80 transmits funds corresponding to the value 70 to the billing server 16. The carrier server 18 typically holds a small amount of the funds back and transmits the rest of the funds to the billing server 16. At 82, the billing server 16 transmits a portion of the funds received from the carrier server 18 to the subscription server 28.

Referring again to FIG. 1, the user device interactive module 42 has in interface that is transmitted to the user mobile phone 12 and is responsible for communicating with the user mobile phone 12 to redeem the code at 76 and create the account at 78 in FIG. 4. The account is created within the account database 38. Once the account has been created and the user successfully logs into the account, the user is provided with access to the subscription content 34. Users who do not have accounts or who have not logged in are not provided access to the subscription content 34. The code issuing module 32 is used to communicate codes with the code management module 44 at 60 in FIG. 4.

Figure 6:
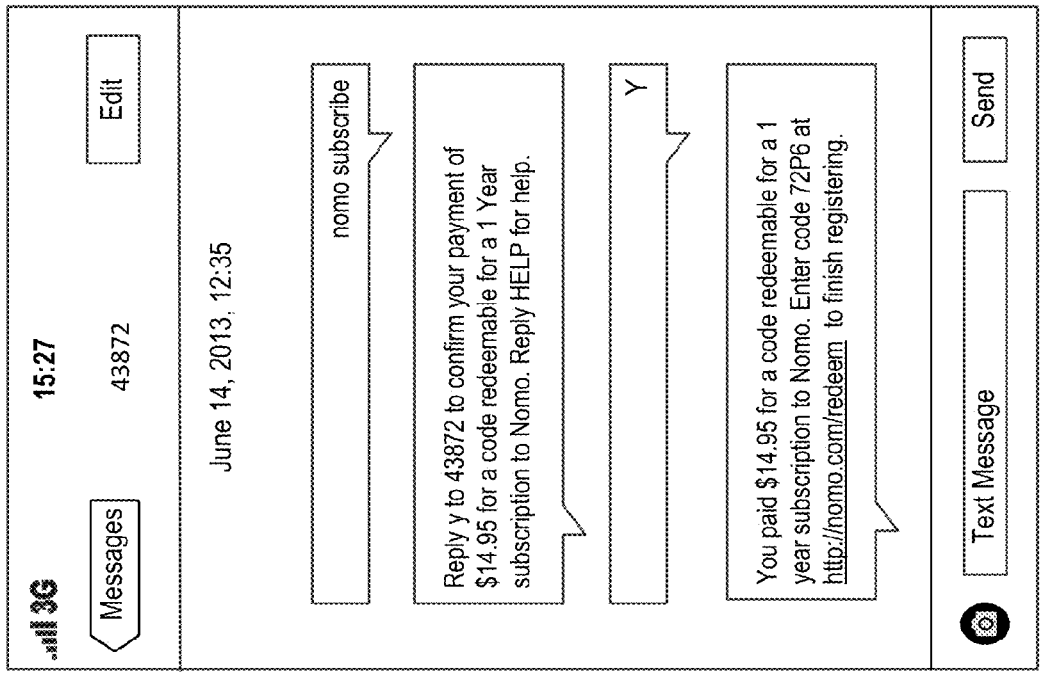
FIG. 6 is a view of a user mobile device in the form of a user mobile phone forming part of the subscription management system when it is used to exchange text messages.

FIG. 5 is a view of a sign 20 that is displayed for advertising a subscription. FIG. 6 illustrates the text messages that are exchanged at 62, 64, 66 and 74 in FIG. 4. FIG. 7 illustrates a redemption page that is transmitted to the user mobile phone 12 after the user selects the link in the final text message in FIG. 6. The redemption page has a field for the user to enter a code and a "Submit" button to send the code to the subscription server 28. When the subscription server 28 receives the code the subscription server 28 returns a first account details page to the user mobile phone 12 as shown in FIG. 8. The first account details page includes fields for the user to enter a user name and a password. The user selects the "Submit" button in FIG. 8 to transmit the user name and password to the subscription server 28. The subscription server 28 then transmits a second account details page to the user as shown in FIG. 9. The second account details page includes fields for entering a name, a street or P.O. Box address, a city, a state or a zip code. The particular fields represent typical fields for a delivery address within the United States. Other countries may have different fields for delivery addresses. The user selects the "Submit" button in FIG. 9 to transmit the data entered within the fields to the subscription server 28.

FIG. 10 illustrates accounts within the account database 38 in FIG. 1 after a new account has been created. When comparing FIGS. 3 and 10, it can be seen that a new, seventh, account has been created.

Figure 11:
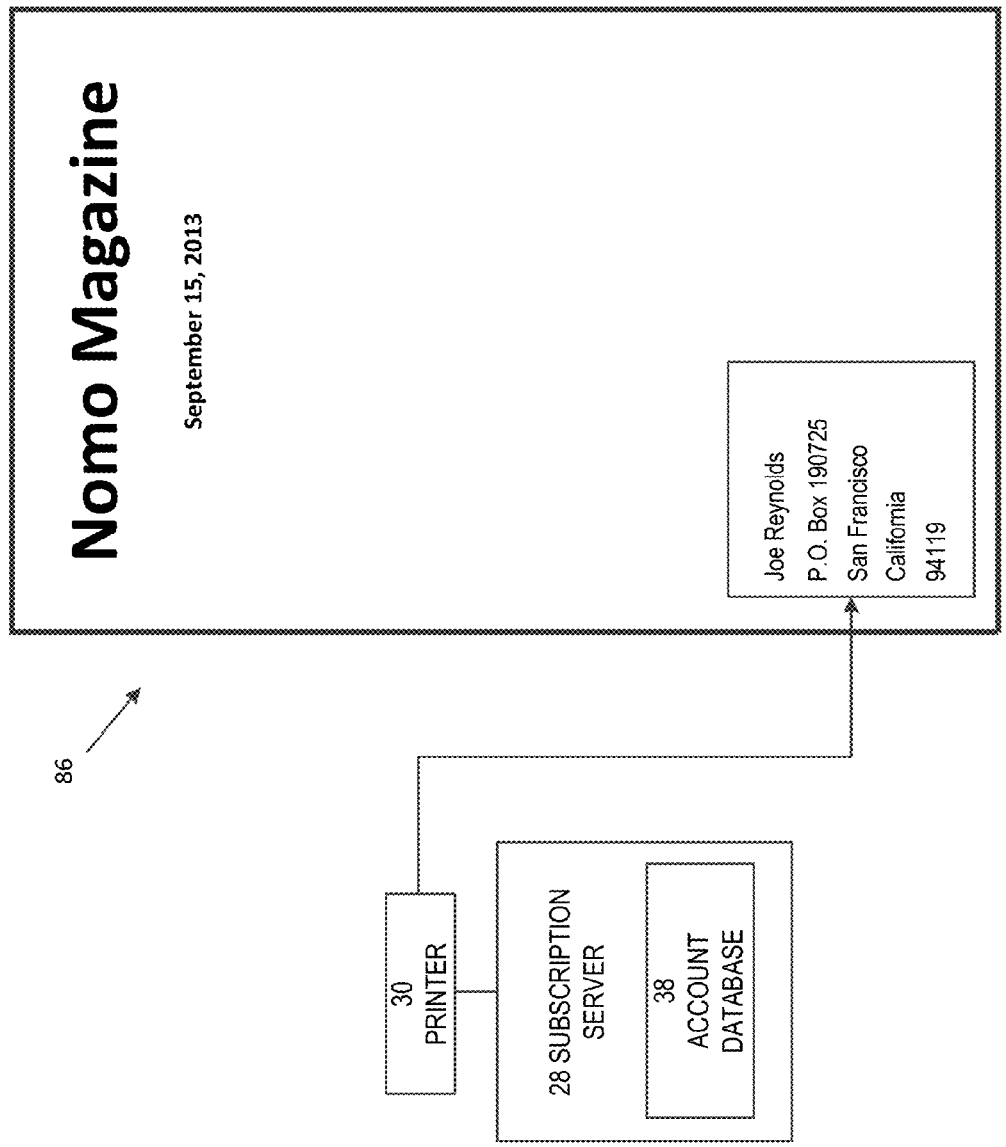
FIG. 11 is a schematic view that includes a block diagram of components of a subscription server system forming part of the subscription management system and a front view of a magazine with an address printed thereon.

FIG. 11 illustrates the subscription server 28, the printer 30 and a magazine 86. The printer 30 utilizes the account database 38 within the subscription server 28 to access the delivery addresses shown in FIG. 10. The printer 30 then prints a respective delivery address on a respective label that can form part of the magazine 86 or be attached to the magazine 86 after it has been printed. The magazine 86 is then mailed by an operator of the subscription server 28 to the address on the label.

Figure 12:
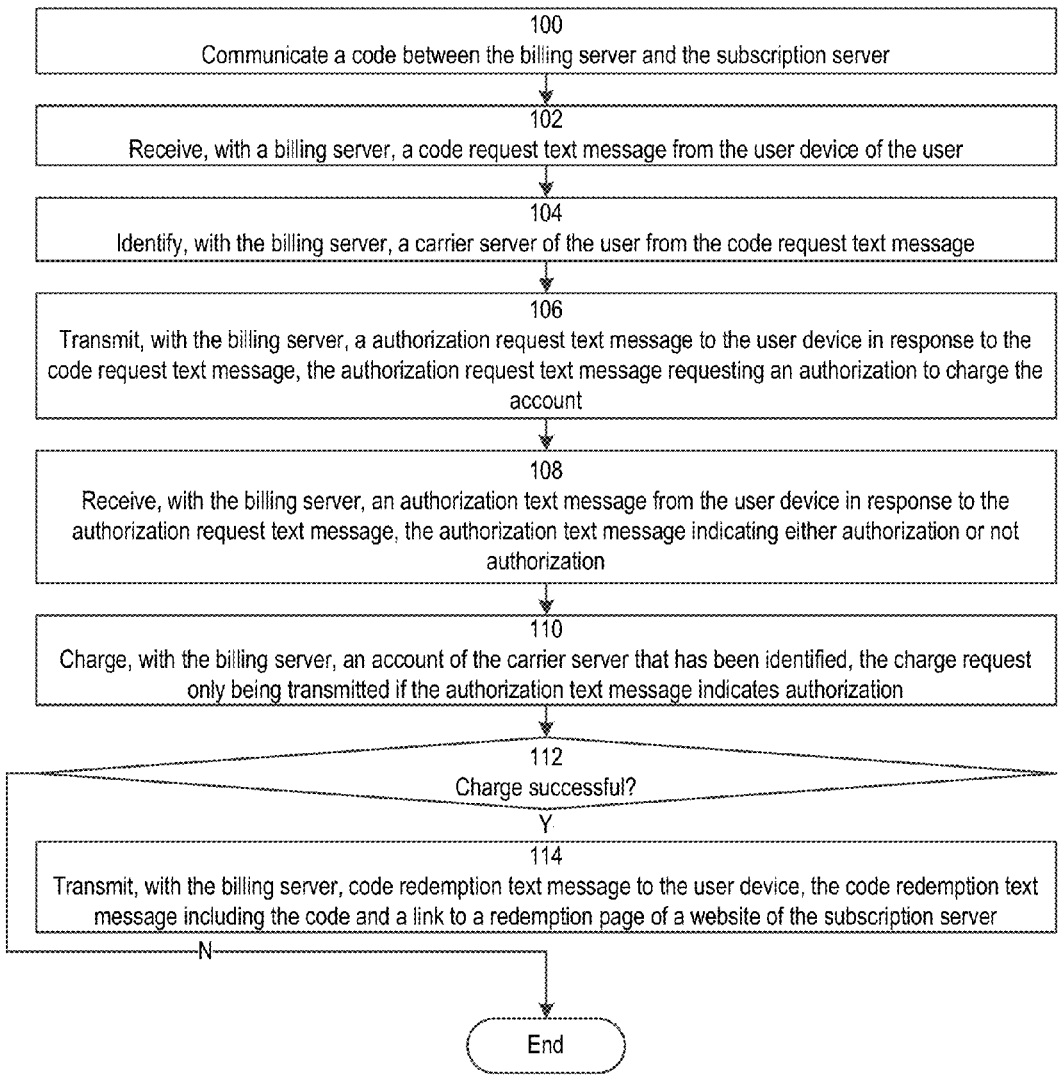
FIG. 12 is a flow chart illustrating functioning of the subscription management system.
Figure 13:
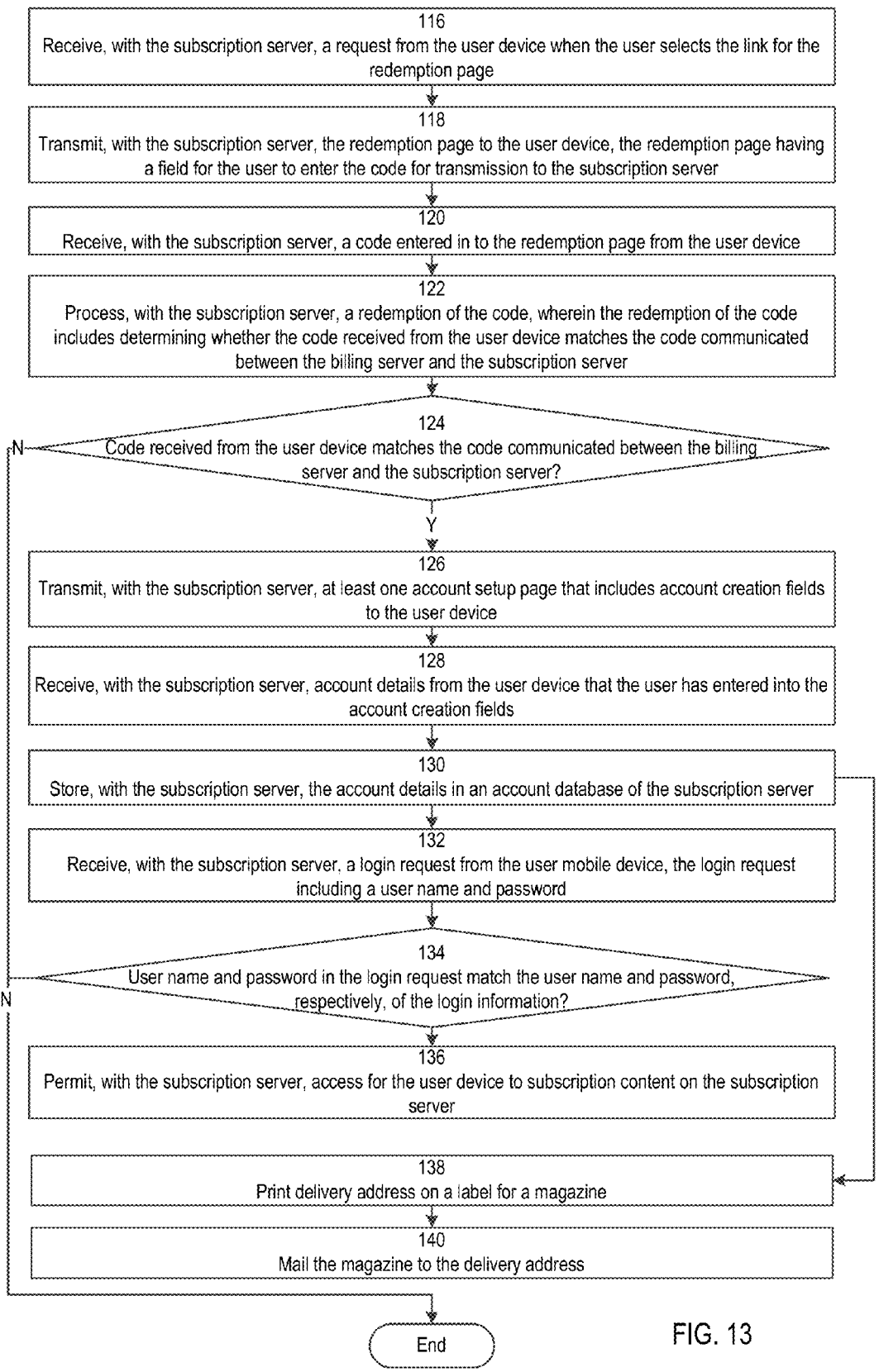
FIG. 13 is a flow chart illustrating functioning of the subscription management system following a final step in FIG. 12.

FIGS. 12 and 13 illustrate the flow as hereinbefore described in more detail. At 100, a code is communicated between the billing server 16 and subscription server 28 as discussed with respect to FIG. 4. At 102, the billing server 16 receives a code request text message from the user device of the user as discussed with reference to FIG. 4. At 104, the billing server 16 identifies a carrier server 18 of the user from the code request text message, as discussed with reference to FIG. 2. At 106, the billing server 16 transmits an authorization request text message to the user device in response to the code request text message. The authorization request text message requests an authorization to charge the account, as discussed with reference to FIGS. 4 and 6. At 108, the billing server 16 receives an authorization text message from the user device in response to the authorization request text message. The authorization text message indicates either authorization or not authorization. Authorization has been described with reference to FIGS. 4 and 6. The user may also indicate that authorization is not provided or not provide a response to the authorization request text message.

At 110, the billing server 16 charges an account of the carrier server 18 that has been identified, as discussed with reference to FIG. 4. The charge request is only transmitted if the authorization text message indicates authorization. At 112, a determination is made by the billing server 16 whether a charge has been successful. The billing server 16 may for example receive a confirmation from the carrier server 18 as described with reference to FIG. 4. If the charge has been successful, then the billing server 16 proceeds to 114 and transmits the code redemption text message to the user device as described with reference to FIGS. 4 and 6. The code redemption text message includes the code and a link to a redemption page of a website of a subscription server 28. If at 112 a determination is made that the charge has not been successful, then the process ends without proceeding to 114.

FIG. 13 follows step 114 in FIG. 12. At 116, the subscription server 28 receives a request from the user device when the user selects the link for the redemption page. At 118, the subscription server 28 transmits the redemption page to the user device, as described with reference to FIG. 7. The user then enters a code as described with reference to FIG. 7 and transmits the code back to the subscription server 28. At 120, the subscription sever 28 receives the code entered into the redemption page from the user device. At 122, the subscription server 28 processes redemption of the code. The redemption of the code includes determining whether the code received from the user device matches the code communication between the billing server 16 and the subscription server 28, as discussed with reference to FIG. 4. At 124, the subscription server 28 determines whether the code received from the user device matches the code communicated between the billing server 16 and the subscription server 28. If the codes do match, then the subscription server 28 proceeds to 126. At 126, the subscription server 28 transmits at least one account set up page that includes account creation fields to the user device, as discussed with reference to FIGS. 8 and 9. If the codes are determined not to match at 124, then the process is ended without proceeding to step 126.

At 128, the subscription server 28 receives the account details from the user device that the user has entered into the account creation fields. At 130, the subscription server 28 stores the account details in an account database 38 of the subscription server 28.

At 132, the subscription server 28 receives a login request from the user device, the login request including a user name and password. At 134, the subscription server 28 determines whether the user name and password in the login request match the user name and password, respectively, of the login information. If the login information matches, then the subscription server 28 proceeds to 136. If the login information does not match then the process is ended without going to 136. At 136, the subscription server 28 permits access of the user device to subscription content 34 on the subscription server 28. In the present example the subscription content 34 is an electronic edition of a magazine. In another example the subscription content 34 can be music, videos, etc.

Following 130, the subscription server 28 can also proceed to 138. At 138, the subscription server 28 prints a delivery address on a label for a magazine as described with reference to FIG. 11. At 140, an operator of the subscription server 28 mails the magazine to the delivery address, as described with reference to FIG. 11.

Referring again to FIG. 1, the subscription server 28 has an expiration management module 141, a subscription identifier communication module 142, and a renewal module 144. The billing server 16 has a subscription identifier communication module 146 and a renewal module 148. The expiration management module 141 determines a subset of accounts for which expirations thereof are less than a predetermined amount of time in the future and generates a renewal notification for each one of the accounts. The subscription identifier communication module 142 of the subscription server 28 communication with the subscription identifier communication module 146 of the billing server 16 to communicate subscription identifiers between them. The SMS messaging module 48 receives a subscription identifier text message from the user mobile phone 12, including a subscription identifier. The carrier billing module 46 identifies a carrier server 18 of the user and charges an account of the carrier server 18 that has been identified. The renewal module 148 of the billing server 16 transmits a renewal notification to the renewal module 144 of the subscription server 28 and includes the subscription identifier. The renewal module 144 of the subscription server 28 receives the renewal notification and updates the expiration of an account having the subscription identifier to a later expiration.

Figure 14:
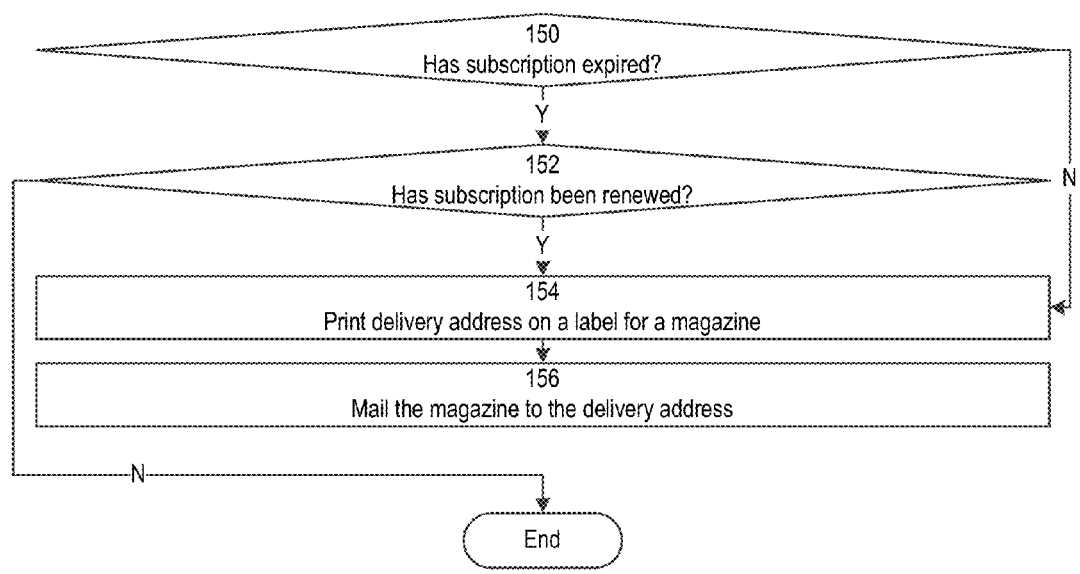
FIG. 14 is a flow chart illustrating how a subscription server determines whether to mail or not to mail a magazine.

FIG. 14 illustrates a process that is carried out by the subscription server 28 in order to determine whether a magazine should be mailed to a delivery address. At 150, the subscription server 28 determines whether a subscription has expired. If the subscription has expired, then the subscription server 28 proceeds to 152 to determine whether the subscription has been renewed. If the subscription has not expired at 150 or if the subscription has been renewed at 152, then the subscription server 28 proceeds to 154 to print a delivery address of the account on a label for a magazine. At 156, the operator of the subscription server 28 mails the magazine to the delivery address. If the determination at 152 is that the subscription has not been renewed, then the process is ended before printing the delivery address and mailing the magazine at 154 and 156 respectively.

Figure 15:
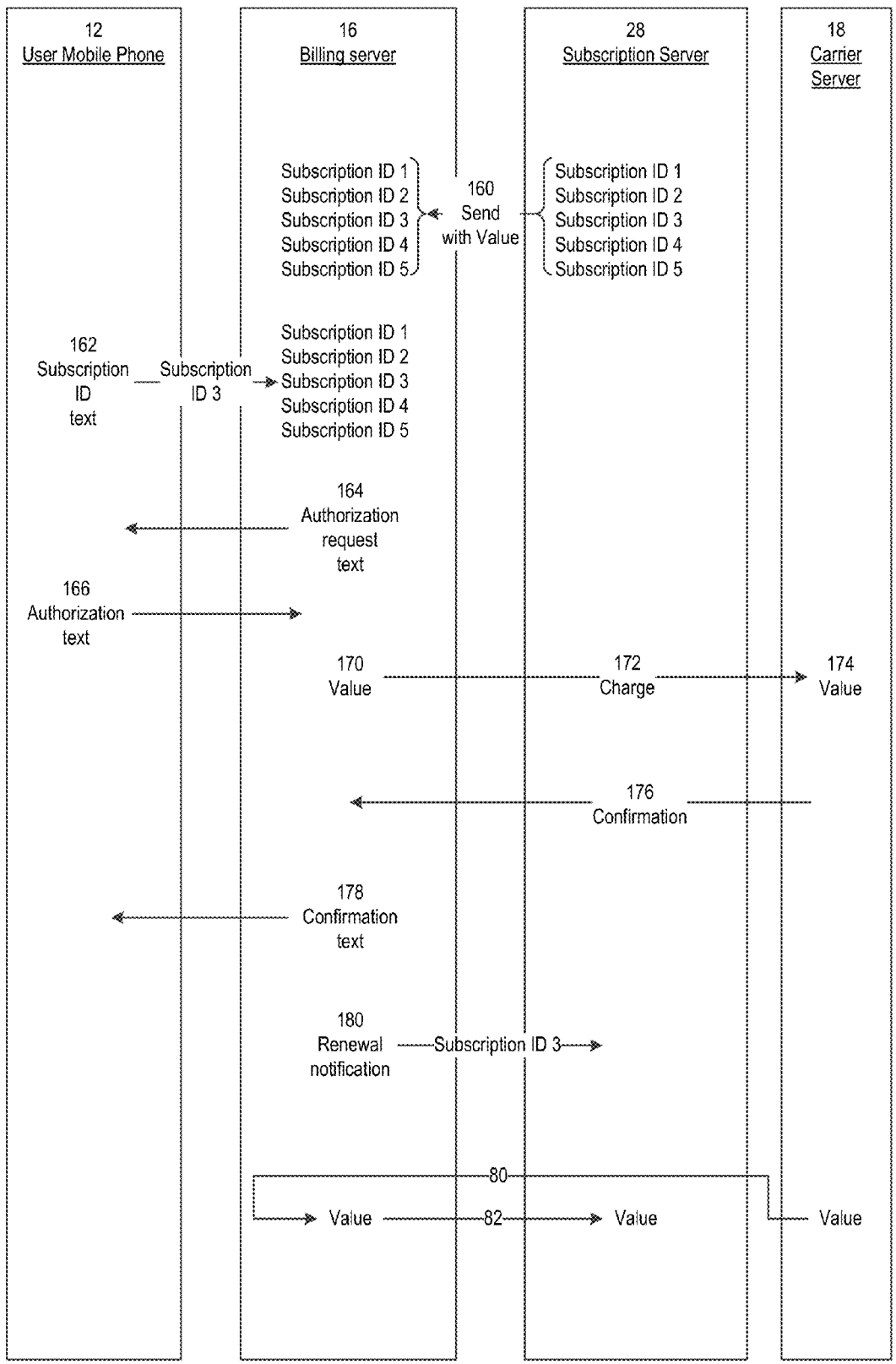
FIG. 15 is interactive chart illustrating renewal of a subscription.

FIG. 15 illustrates how a subscription can be renewed. At 160, the subscription server 28 and billing server 16 communicate subscription identifiers of the accounts shown in FIG. 10. In the present example the subscription server 28 sends the subscription identifiers to the billing server 16. The subscription server 28 also includes a value that is to be charged by the billing server 16 for renewals for each one of the subscription identifiers. The billing server 16 receives the subscription identifiers and stores the subscription identifiers in a data store.

At 162, the user of the user mobile phone 12 generates and sends a subscription identifier text message to the billing server 16. The subscription identifier text message includes a subscription identifier corresponding to an account that the user wishes to renew. The billing server 16 receives the subscription identifier text message and attempts to match the subscription identifier in the subscription identifier text message with one of the subscription identifiers in the data store. In the present example the subscription identifier 3 is a match.

In another embodiment, the subscription server 28 does not send a batch of subscription identifiers at 160. When the billing server 16 at 162 receives the subscription identifier, the billing server 16 may make a call to the subscription server 28 to verify that the subscription identifier is located within the database of the subscription server 28. Only when the subscription server 28 responds with a verification does the billing server 16 proceed as will be discussed below.

As discussed with reference to FIG. 2, the billing server 16 also receives the phone number 22 of the user mobile phone 12 and a carrier identifier of the carrier server 18.

At 164, the billing server 16 transmits an authorization request text message to the user mobile phone 12. At 166, the user of the user mobile phone 12 returns an authorization text message to the billing server 16.

The value that is received from the subscription server 28 at 160 is stored as a value 170 within the billing server 16. At 172, the billing server 16 responds to the authorization text message sent at 166 to attempt to charge a value 174 corresponding to the value 170 on an account at the carrier server 18. The carrier server 18 is selected based on its carrier identifier and the charge 172 includes the phone number 22 of the user mobile phone 12. At 176, the carrier server 18 returns a confirmation to the billing server 16.

The billing server 16 responds to the confirmation at 176 to send a confirmation text message at 178 to the user mobile phone 12. The billing server 16 also responds to the confirmation received at 176 to send a renewal notification at 180 to the subscription server 28. The renewal notification sent at 180 includes the subscription identifier that was received in the subscription identifier text message 162. The renewal notification 180 is received by the subscription server 28. The subscription server 28 then updates the account having the subscription identifier in the renewal notification so that the account has a new subscription expiration. The expiration may for example be extended by twelve months so that the user of the user mobile phone 12 will receive twelve monthly editions or fifty-two weekly editions of a magazine.

The carrier server 18 places a value 174 on a phone bill of the user of the user mobile phone 12. After the user has paid their phone bill, the carrier server 18 at 80 transmits funds corresponding to the value 174 to the billing server 16. The carrier server 18 typically holds a small amount of the funds back and transmits the rest of the funds to the billing server 16. At 82, the billing server transmits a portion of the funds received from the carrier server 18 to the subscription server 28.

Figure 16:
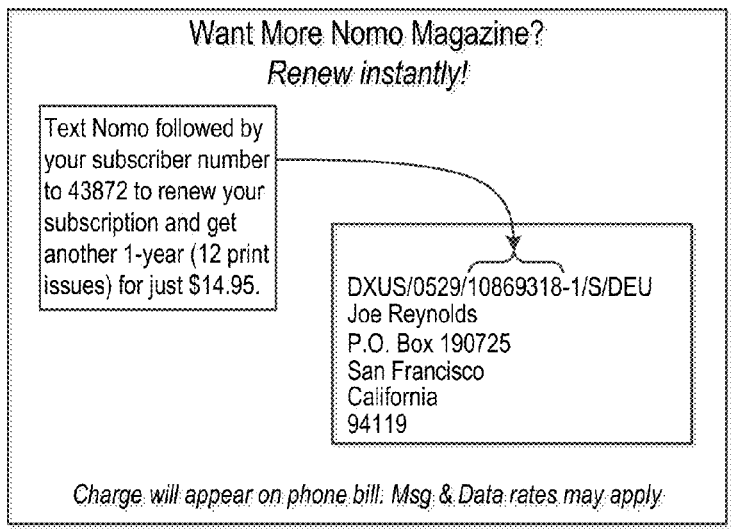
FIG. 16 is a front view of a renewal notification that is included in a magazine.

FIG. 16 illustrates an insert that is typically included within a magazine when the subscription server 28 makes a determination that a subscription is approaching its expiration date. The insert includes a subscription identifier of the present account, in the present example 10869318. The insert also includes a short code of the billing server 16, in the present example 43872. The insert also includes instructions to send a text message to the short code of the billing server 16 and to include the subscription identifier in order to receive a subscription for a time period, in the present example an additional 12 months, and states how much will be charged to the user's phone bill. The user responds to the notification on the insert in FIG. 16 to send the subscription identifier text message 162 in FIG. 15.

Figure 17:
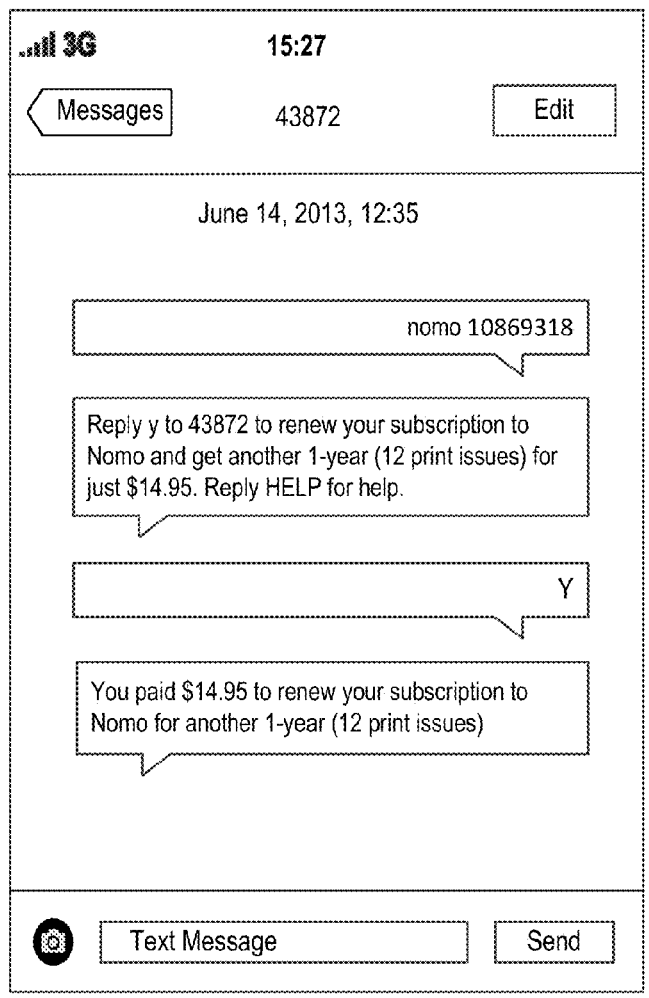
FIG. 17 is view of the user mobile phone illustrating text messages that are exchanged with a billing server for purposes of renewing a subscription.

FIG. 17 illustrates text messages that are exchanged at 162, 164, 166 and 178 in FIG. 8.

Figure 18:
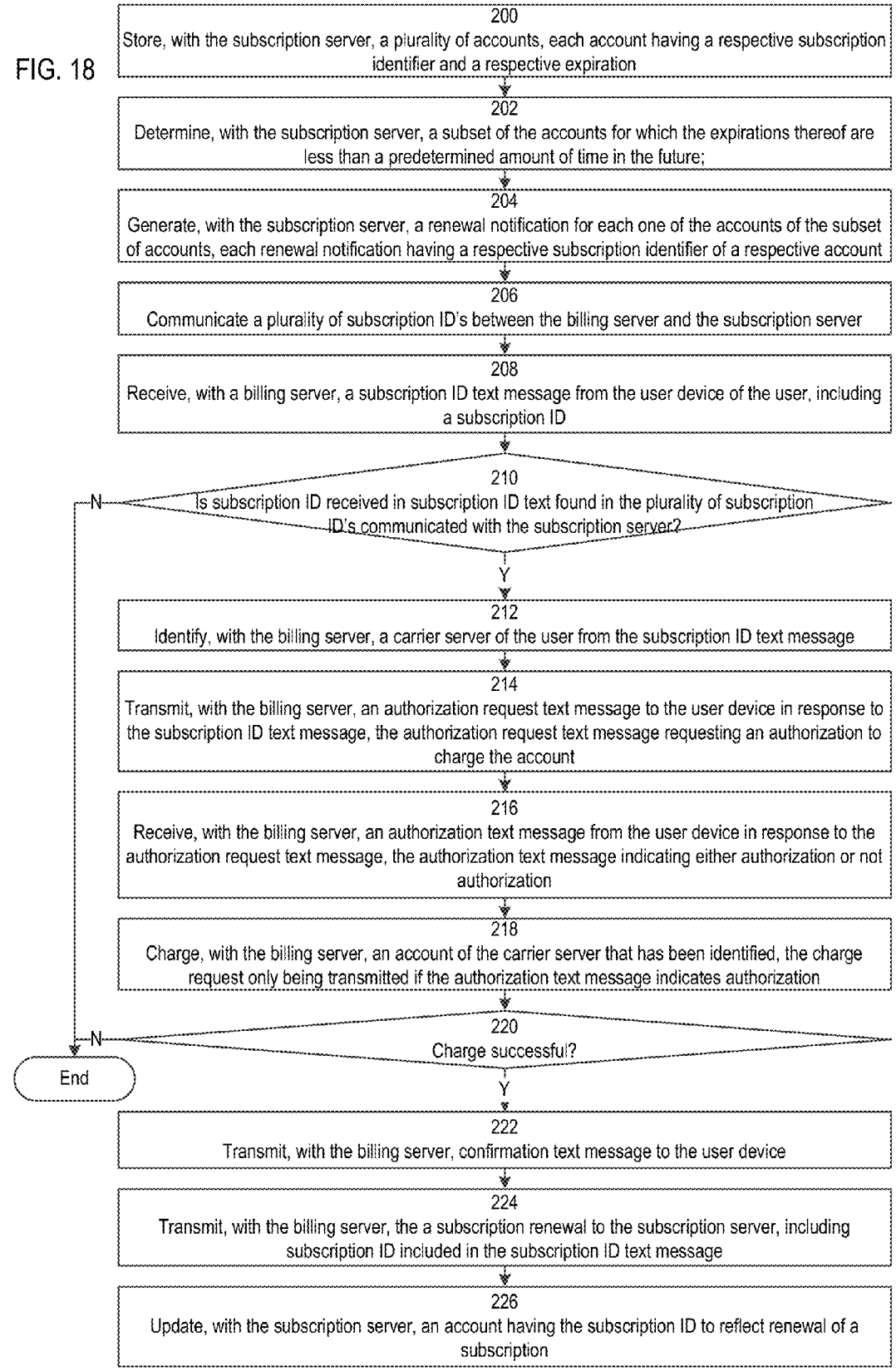
FIG. 18 is a flow chart illustrating subscription renewal.

FIG. 18 illustrates the process described with reference to FIGS. 15 to 17 in more detail. At 200, the subscription server 28 stores a plurality of accounts, each account having a respective subscription identifier and a respective expiration. FIG. 10 illustrates the accounts that are stored by the subscription server 28. At 202, the subscription server 28 determines a subset of the accounts for which the subscriptions thereof are less than a predetermined amount of time in the future. The subscriptions are typically renewed annually. The subscription server 28 may for example identify the subset of accounts where the subscriptions will expire within the next two months.

At 204, the subscription server 28 generates a renewal notification for each one of the accounts of the subset of accounts, each renewal notification having a respective subscription identifier of a respective account. In the given example, the subscription server 28 prints a renewal notification as shown in FIG. 16, and then prints the delivery address on a label for the magazine before the subscription has been renewed and an account has been updated to reflect the renewal of the subscription. An operator then mails the magazine together with the printed renewal notification to the address on the label.

At 206, the subscription server 28 and billing server 16 communicate a plurality of subscription identifiers as described with reference to FIG. 15.

At 208, the billing server 16 receives a subscription identifier text message from the user device of the user, including the subscription identifier.

At 210, the billing server 16 makes a determination whether the subscription identifier received in a subscription identifier text message is found in the plurality of subscription identifier communicated with the billing server 16. If no match is found, then the process is ended without proceeding to step 212. If a match is found, the billing server 16 proceeds at 212 to identify a carrier server 18 of the user from the subscription identifier text message.

At 214, the billing server 16 transmits an authorization request text message, as described with reference to FIG. 15, to the user device in response to the subscription identifier text message, the authorization text message requesting an authorization to charge the account. At 216, the billing server 16 receives an authorization text message from the user device in response to the authorization request text message, the authorization text message indicating either authorization or not authorization. At 218, the billing server 16 charges an account of the carrier server 18 that has been identified. The charge request is only transmitted if the authorization text message includes the authorization.

At 220, the billing server 16 determines whether a charge has been successful. The billing server 16 will typically receive a confirmation from the carrier server 18 as described with reference to FIG. 15. If the charge was not successful, then the process is ended without proceeding to step 222. If the charge was successful, then the billing server 16 proceeds at 222 to transmit a confirmation text message to the user device, as described with reference to FIG. 15. The billing server 16 also proceeds to 224 to transmit a subscription renewal to the subscription server 28, including the subscription identifier included in the subscription identifier text message, as described with reference to FIG. 15.

At 226, the subscription server 28 updates an account having the subscription identifier to reflect renewal of the subscription. For a twelve month subscription, the expiration is typically updated to a date that is twelve months after the original expiration.

As further shown in FIG. 1, the subscription server 28 includes a recurring billing management module 240 and the billing server 16 includes a user opt-in management module 242.

Figure 19:
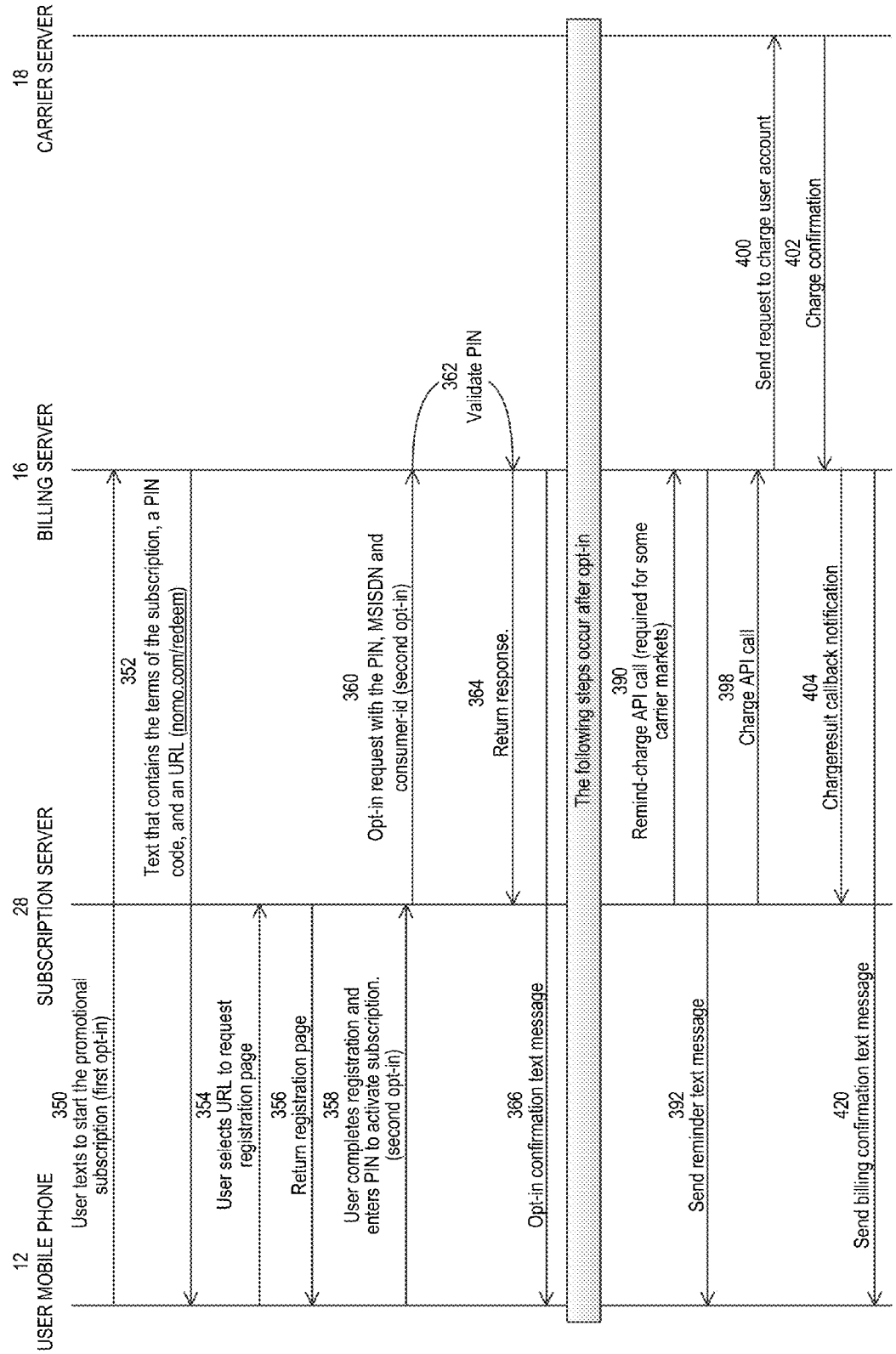
FIG. 19 is an interactive diagram illustrating how the user mobile phone, subscription server, billing server and carrier server interact for establishing a subscription opt-in and a subsequent charge.

FIG. 19 illustrates the process for the user mobile phone 12 to opt-in to a subscription and subsequent charging of the user. At 350, the user sends a text message to start a promotional subscription to a short code of the billing server 16. The text message 350 serves as a first opt-in request.

The billing server 16 uses the msisdn and carrier identifier appended to the text message to obtain information regarding the elements required to charge a user.

In general, the msisdn and the network of the user mobile phone 12 are required inputs to collect from the user mobile phone 12. In some countries there can be additional elements such as a zip code or a resident registration number. A text response transmitted at 352 includes a unique code that is generated by the billing server 16 specifically for an opt-in by a user for repeated subscription billing. The text response 352 also includes a uniform resources locator (URL) that the user can select to redeem the code.

Figure 20:
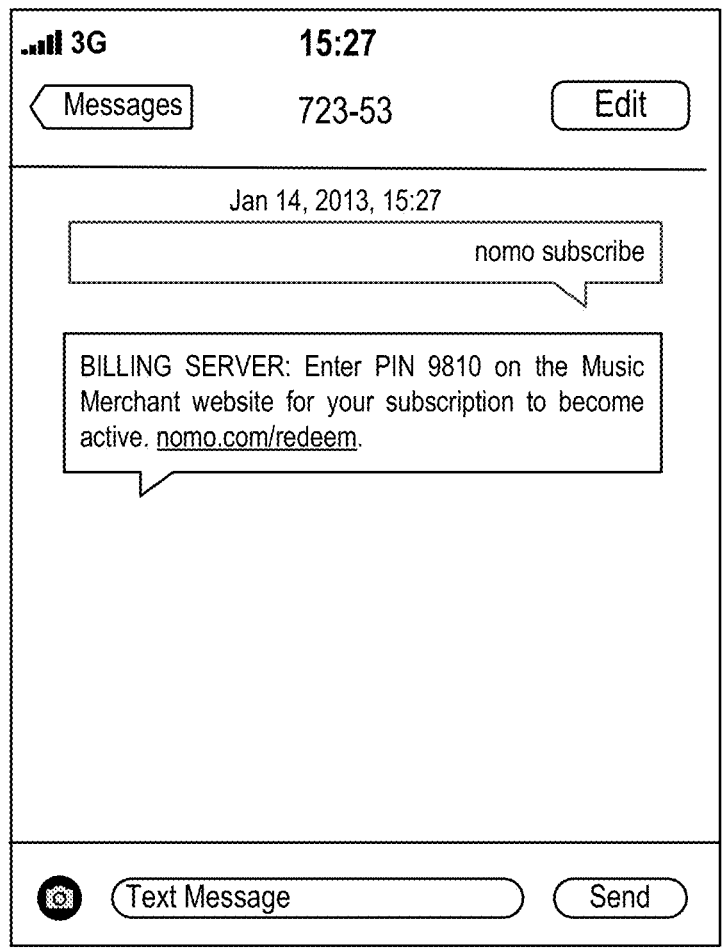
FIG. 20 shows a text message that is received by the user mobile phone after entry of the data in FIG. 5.

FIG. 20 shows the text messages that are sent and received by the user mobile phone 12 at 350 and 352 in FIG. 19.

At 354 in FIG. 19, the user selects the URL in the response text message 352 to request a registration page from the subscription server 28. At 356, the subscription server 28 returns a registration page for display by the browser application 24 of the user mobile phone 12. FIG. 21 shows an interface that is displayed for the user to enter and transmit a name, email address, delivery address and personal identification number (PIN) code. At 358 in FIG. 19, the user mobile phone 12 enters the PIN code received in the text message of FIG. 20 into the PIN code field and transmits it to the subscription server 28. The subscription server 28 receives the PIN code from the user mobile phone 12 and at 360 in FIG. 19 transmits the retrieved PIN code, along with the msisdn and consumer-id, in a second opt-in request to a dedicated URL at the billing server 16. The billing server 16 then at 362 verifies and validates the PIN code received from the subscription server 28 against the PIN code transmitted in the text message at 352, and at 364, sends a response back to the subscription server 28. The billing server 16 records or stores the result of the user's opt-in so that it can be referenced on subsequent charge application programmable interface (API) calls that occur when the user is charged for the renewal subscription billing cycles.

Table 1 shows the opt-in request parameters that are transmitted at 360 in FIG. 19. Tables 2 and 3 show opt-in response parameters that are determined by the billing server 16 and provided to the subscription server 28 in the response 364 in FIG. 19.

TABLE 1

| Parameter | Type | Description | Required |
|---|---|---|---|
| consumer-id | String | Merchant provided unique consumer identifier. | Yes |
| country | String | Country code in ISO 3166-1-alpha-2 standard. | Yes |
| item-description | String | The exact quantity and name of the item(s) being purchased. If more than one of an item is being purchased (e.g. "1000 Credits"), the quantity must be included. Overrides the "Product Description". Restrict to 20 characters. Longer strings will be truncated. | Yes |

TABLE 1-continued

| Parameter | Type | Description | Required |
|---|---|---|---|
| mcc | Number | Mobile Country Code (MCC). MCC and MNC are used together. If used both must be supplied. | No |
| merchant-id | String | Billing server assigned merchant identifier value. | Yes |
| mnc | Number | Mobile Network Code (MNC). | No |
| msisdn | String | Subscriber mobile phone number in international MSISDN format: country code + mobile phone number. | Yes |
| network | String | Billing server network code as supplied from the 'charge-info' API XML | Conditional |
| pin-code | String | PIN code entered by user to indicate opt-in for payment. | Conditional |
| service-id | String | Merchant offering identifier. | Yes |
| subscription-id | String | Merchant assigned unique identifier for the user subscription. | Yes |
| subscription-terms | String | JavaScript Object Notification (JSON) structure. Should follow the example. The 'amount' fields should be specified in fractional units. Frequency is an Enum data structure: DAILY, MONTHLY, YEARLY. Duration is an integer value applied to the frequency. The example specifies a 7 day trial, 799 per month. {'trial':{'amount':0, 'frequency':DAILY, 'duration':7}, 'sub':{'amount': 799, 'frequency': MONTHLY, 'duration': 1}} | Yes |

TABLE 2

| Field | Type | Description | Returned |
|---|---|---|---|
| result-code | String | The result code for this request | Yes |
| result-message | String | Human readable description of the result. | Yes |

TABLE 3

| Result Code | Result Message | Notes |
|---|---|---|
| 0 | Verified | PIN code successfully verified. |
| 23 | Verification in progress. | PIN code has been sent to user, but has not been verified. |
| 103 | Invalid PIN code. | Submitted PIN code is incorrect. |
| 109 | PIN code expired. | The correct PIN code was submitted, but the PIN code has expired. |
| 110 | Verification failed. | Incorrect PIN code was submitted three times. On the next 'option' API call, a new PIN code will be generated and sent to the user via SMS. |

After the subscription server 28 receives the response it displays a receipt page as shown in FIG. 22 on the user mobile phone 12.

Figure 23:
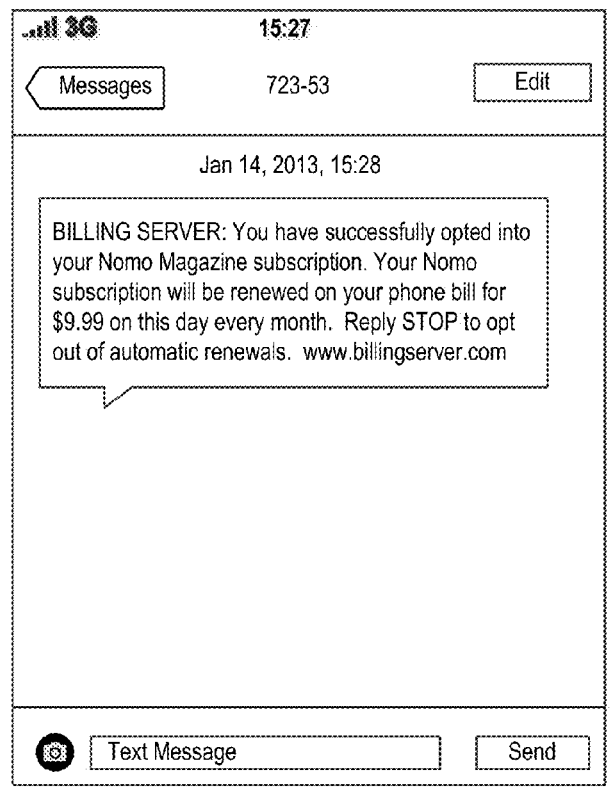
FIG. 23 shows a text message that is received by the user mobile phone indicating successful opt-in for the subscription and discloses the terms of the subscription and provides instructions to the user how to cancel their subscription.

At 366 in FIG. 19, the billing server 16 sends an opt-in confirmation text message to the user mobile phone 12. FIG. 23 shows the confirmation text message as displayed by the SMS application 20 of the user mobile phone 12.

Figure 24:
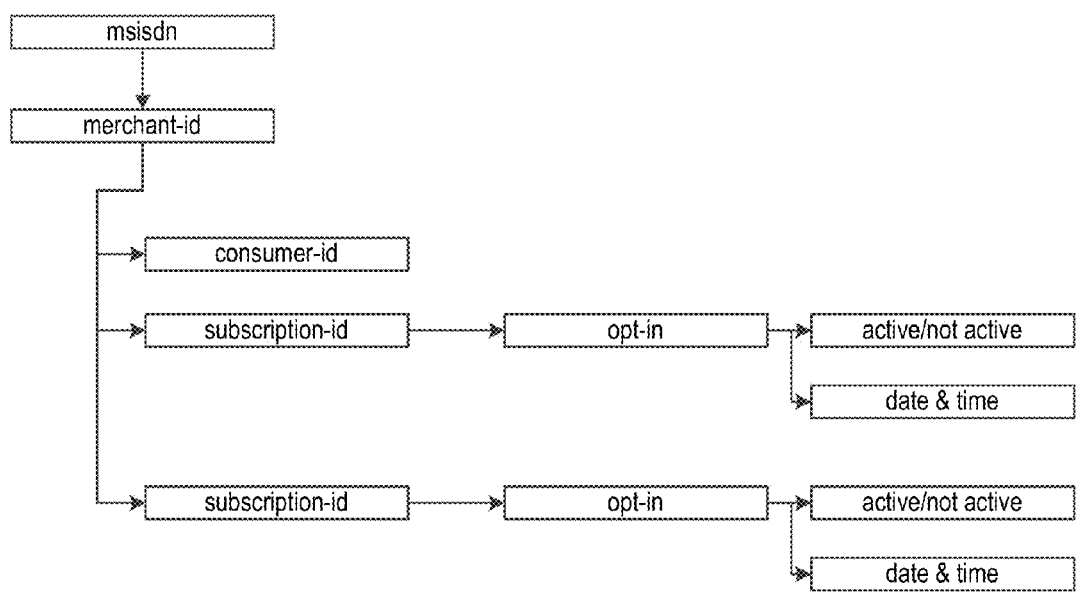
FIG. 24 shows a data structure to indicate an active/inactive opt-in within the billing server.

FIG. 24 shows a data structure within the user opt-in management module 242 in FIG. 1. A subscription-id for a particular merchant-id is retrieved from the respective subscription server 28. The opt-in status of the respective subscription-id is stored as active and the date and time of the activation and can later be set in a selectable manner to inactive. If the opt-in fails, the activation is also set to inactive. A consumer-id allows a user mobile phone 12 to login to an account at the billing server 16. All parameters are stored in relation to a respective msisdn. Each phone number may have one merchant-id having a plurality of subscription-id's for different services and each subscription-id may have a separate set of opt-in parameters.

Referring again to FIG. 19, after the user mobile phone 12 has opted in and the opt-in data is stored as in FIG. 24, the subscription server 28 may at 390 transmit a remind charge API call to the billing server 16. The remind-charge API call is submitted to ta dedicated URL of the billing server 16. A remind-charge method is then used by the billing server 16 to send a subscription renewal reminder text message at 392 in FIG. 19 to user mobile phone 12. Some countries require reminder messages to be sent on a regular schedule because carriers want to ensure that users are aware of their subscription purchases. For this reason, when a user mobile phone 12 subscribes to a monthly service in some countries, it is required that a subscription reminder text message is sent three days prior to each renewal billing cycle. The reminder text message reminds the user that they are subscribed to a service, its cost, how to cancel the subscription and how to contact customer support of the billing server 16. In the case of a free trial, a reminder message should be sent prior to the first renewal charge that occurs after the trial expiration. FIG. 25 shows the text message that is received by the user mobile phone 12.

Table 4 shows parameters for the remind-charge API call at 390 in FIG. 19. Tables 5 and 6 show response parameters for the remind-charge API call that are determined by the billing server 16 and transmitted to the subscription server 28.

TABLE 4

| Parameter | Type | Description | Required |
|---|---|---|---|
| consumer-id | String | Merchant provided unique consumer identifier. | Yes |
| country | String | Country code in ISO 3166-1-alpha-2 standard. | Yes |
| Item-description | String | The exact quantity and name of the item(s) being purchased. If more than one of an item is being purchased (e.g. "1000 Credits"), the quantity must be included. Overrides the "Product Description". Restrict to 20 characters. | Yes |
| merchant-id | String | Billing server assigned merchant identifier value. | Yes |
| msisdn | String | Subscriber mobile phone number in international MSISDN format: country code + mobile phone number. | Yes |
| renewal-date | String | Start date of next subscription cycle. Format: YYYY-MM-DD. | Yes |
| service-id | String | Merchant offering identifier. | Yes |
| subscription-id | String | Merchant assigned unique identifier for the user subscription. | Yes |
| subscription-terms | String | JSON structure, {'sub':{'amount': 799, 'frequency': MONTHLY, 'duration': 1}} | Yes |

TABLE 5

| Parameter | Type | Description | Required |
|---|---|---|---|
| consumer-id | String | Merchant provided unique consumer identifier. | Yes |
| country | String | Country code in ISO 3166-1-alpha-2 standard. | Yes |
| Item-description | String | The exact quantity and name of the item(s) being purchased. If more than one of an item is being purchased (e.g. "1000 Credits"), the quantity must be included. Overrides the "Product Description". Restrict to 20 characters. | Yes |
| merchant-id | String | Billing server assigned merchant identifier value. | Yes |
| msisdn | String | Subscriber mobile phone number in international MSISDN format: country code + mobile phone number. | Yes |
| renewal-date | String | Start date of next subscription cycle. Format: YYYY-MM-DD. | Yes |
| service-id | String | Merchant offering identifier. | Yes |
| subscription-id | String | Merchant assigned unique identifier for the consumer subscription. | Yes |
| subscription-terms | String | JSON structure, {'sub':{'amount': 799, 'frequency': MONTHLY, 'duration': 1}} | Yes |

TABLE 6

| Parameter | Type | Description | Required |
|---|---|---|---|
| consumer-id | String | Merchant provided unique consumer identifier. | Yes |
| country | String | Country code in ISO 3166-1-alpha-2 standard. | Yes |
| Item-description | String | The exact quantity and name of the item(s) being purchased. If more than one of an item is being purchased (e.g. "1000 Credits"), the quantity must be included. Overrides the "Product Description". Restrict to 20 characters. | Yes |
| merchant-id | String | Billing server assigned merchant identifier value. | Yes |
| msisdn | String | Subscriber mobile phone number in international MSISDN format: country code + mobile phone number. | Yes |
| renewal-date | String | Start date of next subscription cycle. Format: YYYY-MM-DD. | Yes |
| service-id | String | Merchant offering identifier. | Yes |
| subscription-id | String | Merchant assigned unique identifier for the consumer subscription. | Yes |
| subscription-terms | String | JSON structure, {'sub':{'amount': 799, 'frequency': MONTHLY, 'duration': 1}} | Yes |

FIG. 26 shows an example of a remind-charge method. At 394, a subscription server 28 sends remind-charge request containing a msisdn, consumer-id, and subscription-terms values. At 396, the billing server 16 sends the SMS message at 392 in FIG. 19 to the user mobile phone 12 that contains the terms of the subscription and STOP instructions (cancel via SMS). The SMS also contains information on how to contact customer service of the billing server 16.

Referring again to FIG. 19, on the date and time that the subscription is due for payment, the subscription server 28 at 398 transmits a charge API call to the billing server 16 to request processing of a payment from the user mobile phone 12 in a single step. The charge API call is submitted to a dedicated URL of the billing server 16. A charge method can be used to support both one-time and recurring (subscription) charge scenarios. When the charge request is for a subscription, a subscription-id and subscription-frequency must be supplied. The subscription-id value references the subscription-id that was collected in the opt-in request. This enables the billing server 16 to check whether there is a corresponding user opt-in for the subscription with a status that is active. In another embodiment another identifier can be received by the billing server 16 from the subscription server 28 for determining the opt-in status for the subscription.

If the charge request is accepted, a charge-id is returned from the billing server 16 to the subscription server 28 at 404 in FIG. 19. Acceptance means that the request has been successfully validated and has been submitted at 400 in FIG. 19 to the carrier server 18 for processing with a valid response from the carrier server 18 at 402. Prior to submitting a charge to the carrier server 18 for processing, risk checks would have already been performed by the billing server 16.

Charge is an asynchronous request. When the charge request has been completed, regardless of a successful or failed charge, the billing server 16, having received the charge result from the carrier server 18, sends a callback notification to the subscription server 28 with the final result of the charge attempt.

The charge request is idempotent. Each request is uniquely identified by the request-id supplied by the subscription server 28. For example, if two charge requests are made with the same merchant request-id, the user's account is charged only once and both charge requests receive the same response.

A chargeresult callback notification 404 provides the final status of a transaction (success or failure) successfully billed chargeresult callback notifications are used by the subscription server 28 to fulfill purchases. For a given transaction, identified by the unique charge-id field value, fulfillment occurs only once. The subscription server 28 may receive a chargeresult callback for the same transaction multiple times if there are communication issues between the billing server 16 and the subscription server 28. Improper acknowledgement responses (ACKs) from the subscription server 28 to the billing server 16 is a common cause of continually retried callback notifications.

The subscription server 28 only receives callbacks from the billing server 16 for requests that have been accepted. If a request was not accepted due to a validation error or due to a risk check, the billing server 16 does not submit the request to the carrier server 18 for processing and therefore a callback notification is not sent from the billing server 16 to the subscription server 28.

Table 7 shows parameters for the charge request at 392 in FIG. 19. Table 8 shows parameters for the chargeresult callback notification at 404 in FIG. 19.

TABLE 7

| Parameter | Type | Description | Required |
|---|---|---|---|
| charge-options | String | JSON structure containing optional charge elements such as zip or rrn. I.e. {'zip: 94939} | No (conditional - optional elements required in specific |

TABLE 7-continued

| Parameter | Type | Description | Required |
|---|---|---|---|
| consumer-id | String | Merchant provided unique consumer identifier. | Yes |
| consumer-ip-address | String | Originating IP address of the consumer; used for risk checks. If it cannot be obtained submit a value of 'NOT_AVAILABLE'. | Yes |
| country | String | Country code in ISO 3166-1-alpha-2 standard. | Yes |
| currency | String | ISO 4217 3 letter currency code. | Yes |
| end-merchant-id | String | Billing server assigned merchant identifier for an end merchant submitting transactions via a reseller. | Yes (if reseller) |
| external-data | String | Merchant supplied meta data. | No |
| external-id | String | External identifier supplied by merchant system. | No |
| external-item-id | String | Merchant assigned identifier for the purchased item. Billing server does not validate this value for uniqueness. | No |
| item-description | String | Product disclosure describing the quantity and type of item being purchased, (i.e. "10 credits" not "credits"). Restricted to 20 characters. Longer strings will be truncated. | Yes |
| mcc | String | Mobile country code (MCC). MCC and MNC are used together. If used, both must be supplied. | No |
| merchant-id | String | Billing server assigned merchant identifier value | Yes |
| mnc | String | Mobile network code (MNC). | No |
| msisdn | Number | Subscriber mobile phone number in international MSISDN format: country code + mobile phone number. | Yes |

TABLE 8

| Field | Type | Description | Returned |
|---|---|---|---|
| charge-id | String | Billing server assigned charge identifier (returned if the 'charge' request is successful). | Conditional |
| consumer-auth-required | Boolean | Indicates whether the 'charge' request requires a user opt-in. | Yes |
| consumer-auth-type | Enum | The type of opt-in required for this country and carrier, (e.g. KEYWORD, PIN). | Conditional |
| consumer-auth-keyword | String | The keyword the consumer must enter to confirm their opt-in. | Conditional |
| consumer-auth-short-code | String | The short code to which the consumer should send the keyword. | Conditional |
| result-code | String | The result code for this request. | Yes |
| result-message | String | Human readable description of the result. | Yes |
| retry-delay | Number | Specifies the minimum time (in milliseconds) that the caller should wait before retrying the request. Returned when a retry error has occurred. | Conditional |

Figure 27:
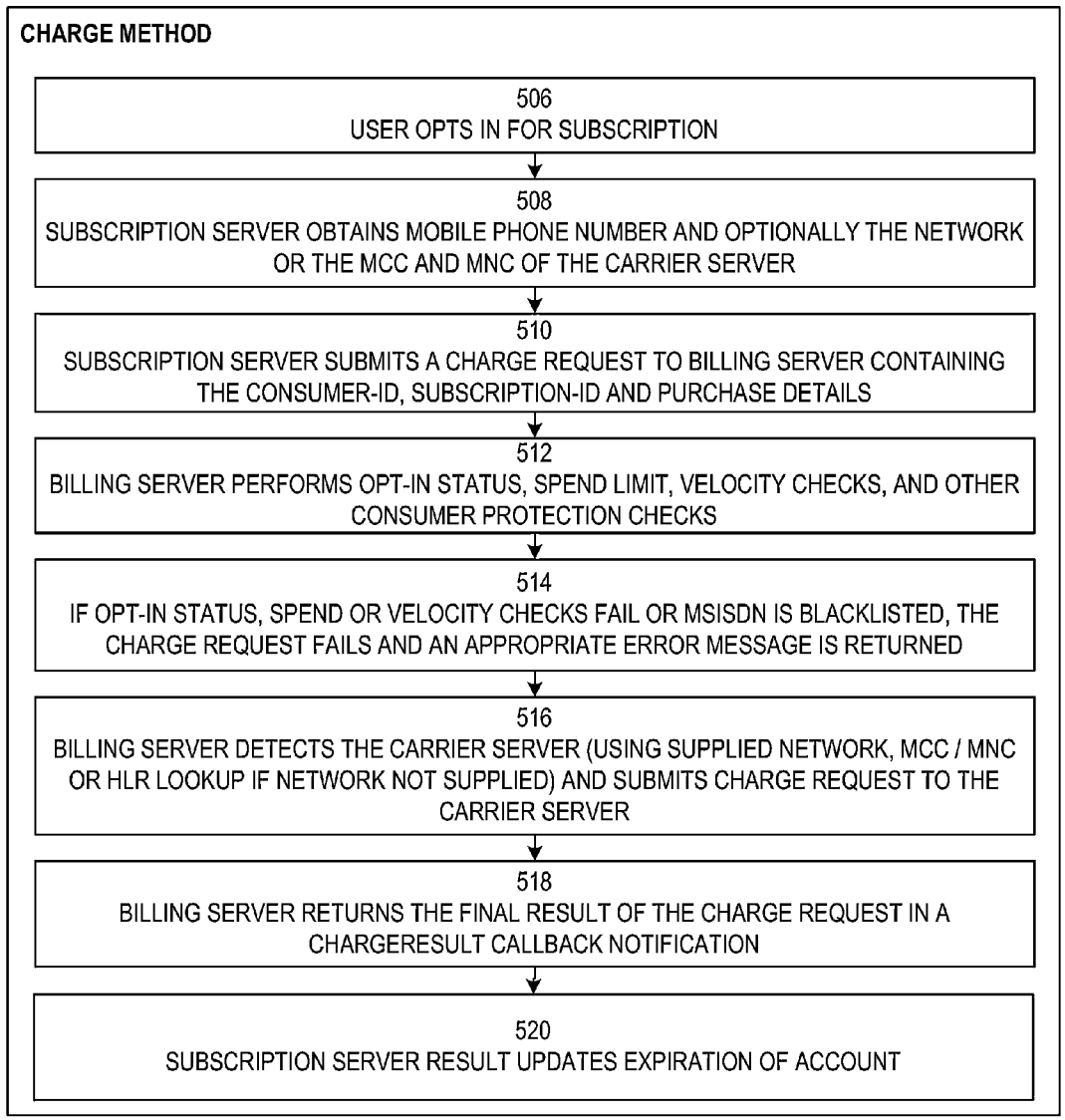
FIG. 27 is a flow chart of a charge method wherein the subscription server instructs the billing server to charge a user account at the carrier server based on the subscription.

FIG. 27 shows an example of a charge method. At 506, a user at a user mobile phone 12 or other user device opts into a subscription. At 508, the subscription server 28 obtains the mobile phone number (msisdn) of the user mobile phone 12 and optionally the network of the carrier server 18. At 510, the subscription server 28 submits a charge request to the billing server 16 containing the customer-id, subscription-id and purchase details. At 512, the billing server 16 performs opt-in status, spend limit, velocity checks, and other user protection checks corresponding to the subscription-id. If at 514 opt-in status, spend or velocity checks fail or the msisdn is blacklisted, the charge request fails and an appropriate error message is returned. At 516, the billing server 16 detects the carrier (using supplied network or a lookup if the network is not supplied) and submits a charge request for an amount equal to or based on the total amount to the carrier server 18 using the carrier's direct API. The charge request from the billing server 16 to the subscription server 28 will only occur if the opt-in status is active, but not if the opt-in status is inactive. At 520, the billing server 16 returns the final result of the charge request in a chargeresult callback notification to the subscription server 28. The subscription server 28 then updates an expiration of an account in FIG. 10.

Figure 28:
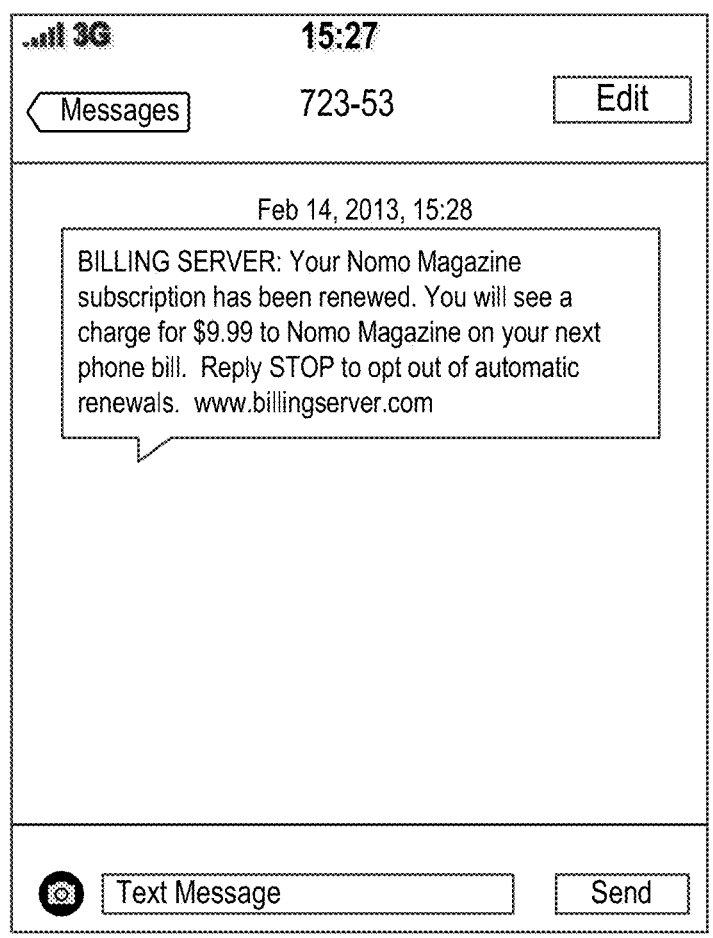
FIG. 28 shows a text message that is received by the user mobile phone when the charge to the carrier server has occurred.

The SMS messaging module 48 then at 420 in FIG. 19 transmits a text message to the user mobile phone 12 to confirm renewal of the subscription. An example of a text message is shown in FIG. 28.

Tables 9 and 10 show parameters for a chargeresult callback notification.

TABLE 9

| Field | Type | Max Length | Notes |
|---|---|---|---|
| action | String | 20 | action = chargeresult |
| charge-id | String | 50 | Unique identifier of the transaction. |
| country | String | 2 | Country code in ISO 3166-1-alpha-2 standard. |
| currency | String | 3 | ISO 4217 3 letter currency code. |
| encoded-mobile | Number | 20 | Obfuscated, alias consumer identifier. |
| total-amount | Number | Int32 | Total amount of charge inclusive of tax. |
| tax-amount | Number | Int32 | Tax amount value included in charge reported in fractional units (See the 'Currency values format' section of this document for more information on fractional units). |
| merchant-payout | Number | Int32 | Merchant net payout value. |
| service-id | String | 50 | Merchant offering identifier. |
| item-description | String | 255 | Product disclosure describing the quantity and type of item being purchased, (i.e. "10 credits" not "credits"). |
| request-id | String | 50 | Unique merchant supplied identifier for this request to ensure that charges are not duplicated. |
| external-id | String | 50 | A merchant supplied identifier for this transaction. |
| external-item-id | String | 50 | Merchant assigned identifier for the purchased item. |
| external-data | String | | Merchant supplied meta data. |
| end-merchant-id | String | 50 | If a reseller, this represents the end merchant. |
| reference-currency | String | 3 | Reference currency unit as set within the merchant service configuration. |
| reference-total-amount | Number | Int32 | Total charge amount based on the reference currency unit. |
| reference-tax-amount | Number | Int32 | Tax amount based on the reference currency unit. |
| reference-merchant-payout | Number | Int32 | Merchant payout based on the reference currency unit. |

TABLE 9-continued

| Field | Type | Max Length | Notes |
|---|---|---|---|
| test | Boolean | Boolean | Used to identify test transactions. (See Testing section in Overview of this document). |
| time-requested | String | UTC Date | Time charge request was initiated in UTC format: YYYY-MM-DD HH:MM:SS. |
| time-completed | String | UTC Date | Time of when the charge request was completed. |
| result-code | String | 20 | The result code for this request. |
| result-message | String | 255 | Human readable description of the result. |
| sig | String | 255 | Hash computation signature generated based on Security Implementation Guide instructions. |
| timestamp | Number | Int64 | Network Time Protocol (NTP) Unix epoch timestamp. |

TABLE 10

| Result Code | Response Message | Comments |
|---|---|---|
| 0 | Operation successful. | Fully paid, successful transaction. |
| 2 | Internal server error. Retry. | Internal billing server error. Notify billing server if this response continues. |
| 3 | Failed - Insufficient funds. | User does not have enough credit to complete the transaction. |
| 4 | Failed - Consumer Barred. | The user has been blocked from transacting. This could be due to a carrier request or due to other anti-fraud mechanisms. |
| 5 | Failed - External billing failure | This response occurs when billing server is unable to bill the user account due to an error received from the carrier. |
| 6 | Failed - Transaction timed out | This error occurs when the transaction does not complete within 24 hours. There are two primary causes for this: A confirmation has been sent to the user (e.g. PIN code entry) and they have not responded. There is a delay or outage with the carrier and billing server has not received a response from the carrier. |
| 7 | Anti-fraud - Transaction rejected | In certain cases, anti-fraud limits may result in a transaction failing e.g. velocity limits. |
| 8 | Failed - Cancelled by consumer | The user sent back a keyword to cancel the transaction. |
| 11 | Regulatory spend limit reached | Regulatory (per carrier rules) spend limit has been reached by the user. |
| 12 | Merchant spend limit reached | Merchant specified spend limit has been reached by the user. |
| 14 | Service suspended | |
| 15 | Network unavailable | |
| 67 | Product description pending approval | This error occurs when product descriptions submitted to the carrier for approval have not yet been approved. |
| 68 | Rejected product description | This error occurs when product descriptions submitted to the carrier are rejected. |
| 86 | Service not supported on network | |
| 90 | Pre-paid account not supported | Pre-paid mobiles are not supported by certain carriers. |
| 95 | Price point not supported on this network | |
| 96 | Account not authorized for purchase | User account cannot use mobile billing service. |
| 97 | Invalid Zip Code | Applicable for certain carrier billing workflows that require user entry of a zip code. |
| 101 | Fulfillment failed | A problem with callback ACK caused a fulfillment failure. The transaction was not billed. This is applicable to carrier networks that require fulfillment to occur before billing the user. |
| 500 | User info validation error | Applicable to certain carrier billing workflows that require the user to enter additional information for validation purposes. |
| 700 | Handset error | Error due sending or receiving the necessary SMS messages to proceed with purchase. |
| 800 | Subscriber not eligible | Certain types of users cannot make purchases using the billing server system e.g. minors. |
| 850 | Internal subscription error | Needs further investigating by billing server. |

Figure 29:
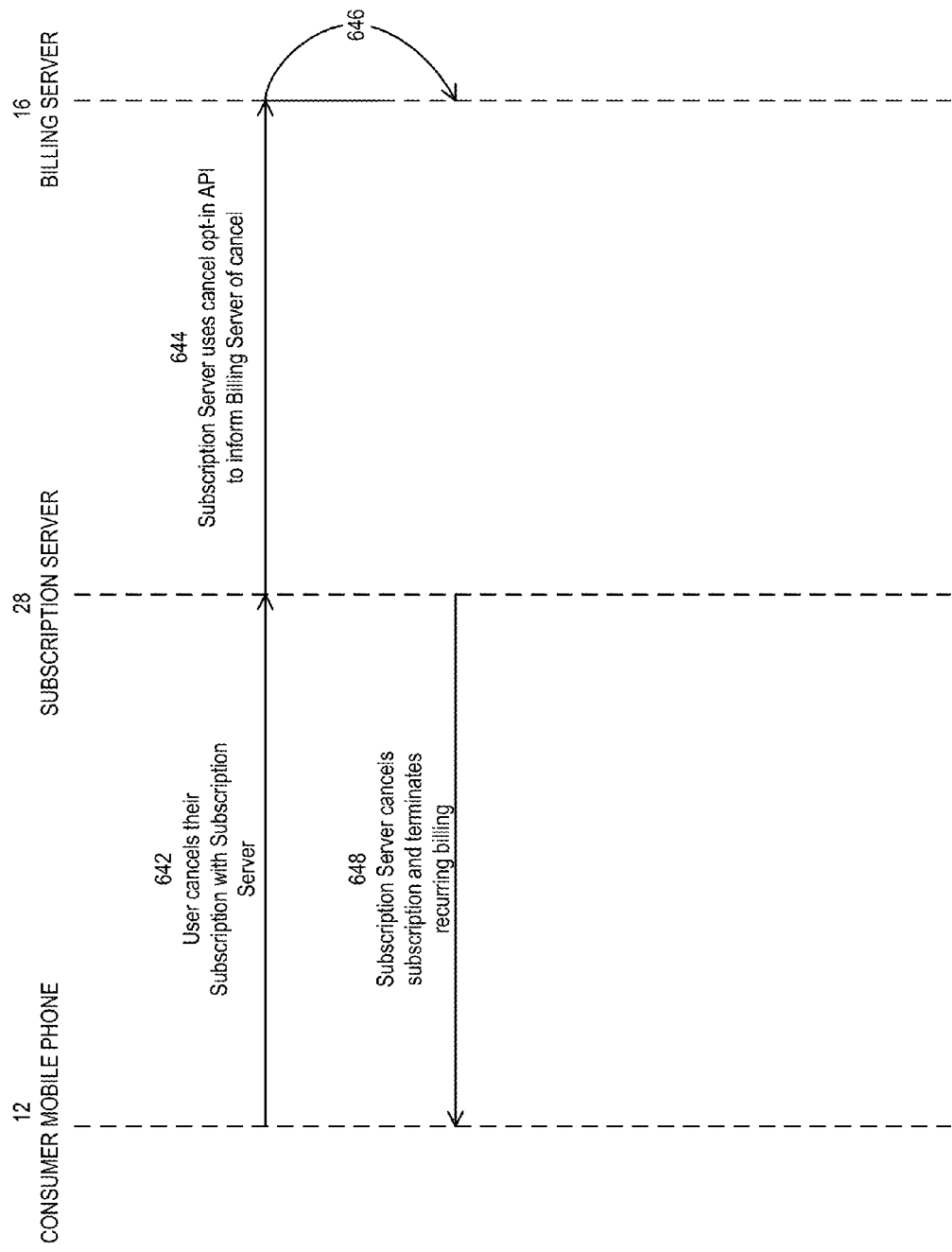
FIG. 29 is an interactive chart showing how the user can cancel the subscription through an interface of the subscription server.

FIG. 29 shows the method wherein the user mobile phone 12 cancels the subscription via the user device interactive module 42 in FIG. 1. At 642 in FIG. 29, the user mobile phone 12 cancels with the subscription server 28 using a user interface in FIG. 1 of the user device interactive module 42. At 644, the subscription server 28 submits a cancel opt-in API call at a dedicated URL of the billing server 16 to notify the billing server 16 to cancel the user opt-in for their subscription. At 646, the billing server 16 cancels the user opt-in and updates the relevant subscription-id in FIG. 24 as inactive. Further charges against this subscription, if submitted by the subscription server 28 to the billing server 16, will be rejected. At 648, the subscription server 28 updates the user interface to reflect that the subscription has been cancelled and recurring billing has been terminated.

Figure 30:
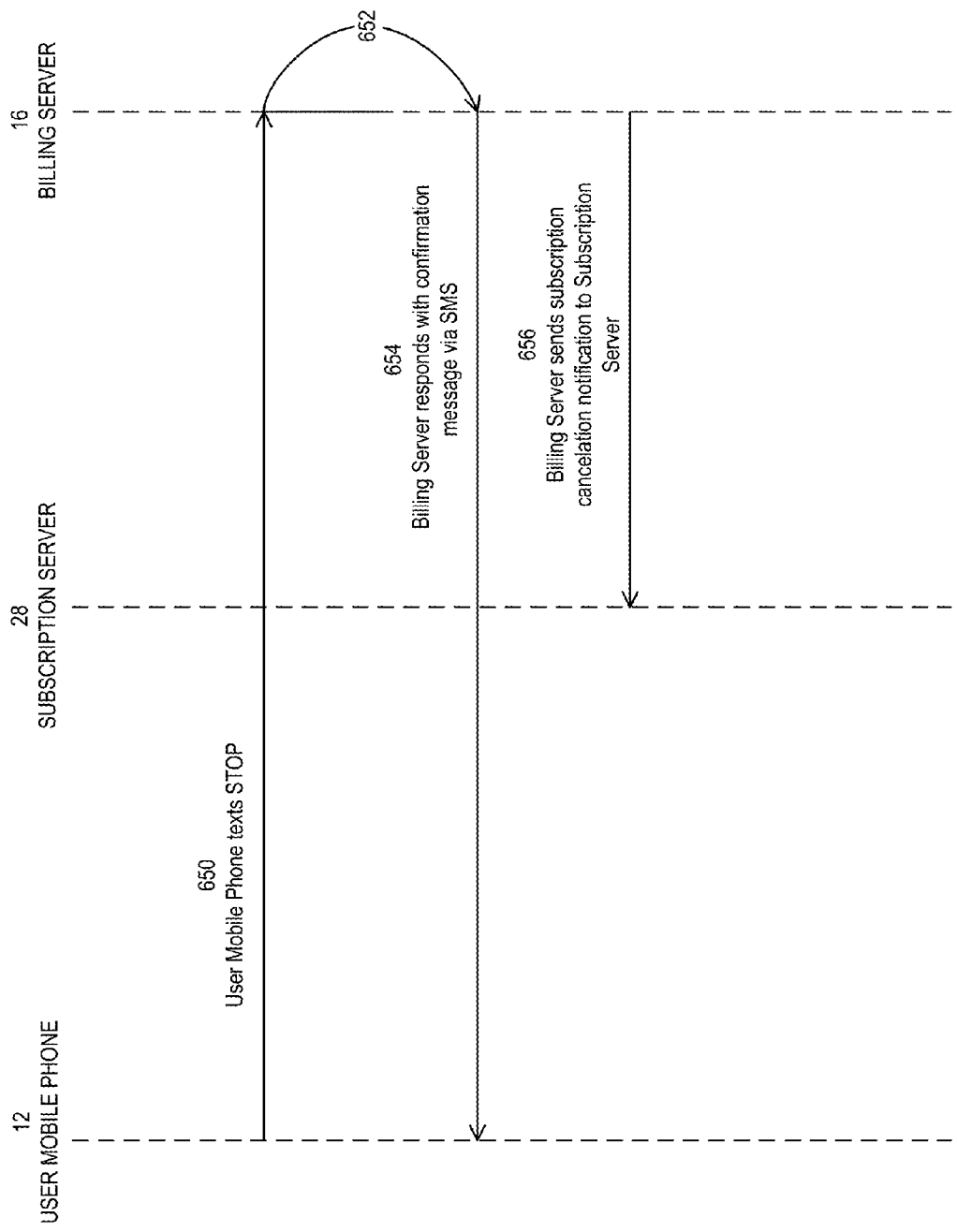
FIG. 30 is an interactive chart showing how the user can cancel the subscription by sending a text message to the billing server.

FIG. 30 shows the method wherein the user cancels the subscription via text messaging. At 650, the user mobile phone 12 sends STOP via SMS text. The text message can be sent as a reply to the short code from which the texts were received by the user mobile phone 12. At 652, the billing server 16 cancels the subscription and updates the relevant subscription-id in FIG. 24 as inactive. Further charges against this subscription, if submitted by the subscription server 28, will be rejected. At 654, the billing server 16 sends a confirmation of cancellation SMS text to the user mobile phone 12. At 656, the billing server 16 sends a user subscription cancellation notification to the subscription server 28 so that the subscription is cancelled at the subscription server 28. The subscription server 28 terminates recurring billing.

Figure 31:
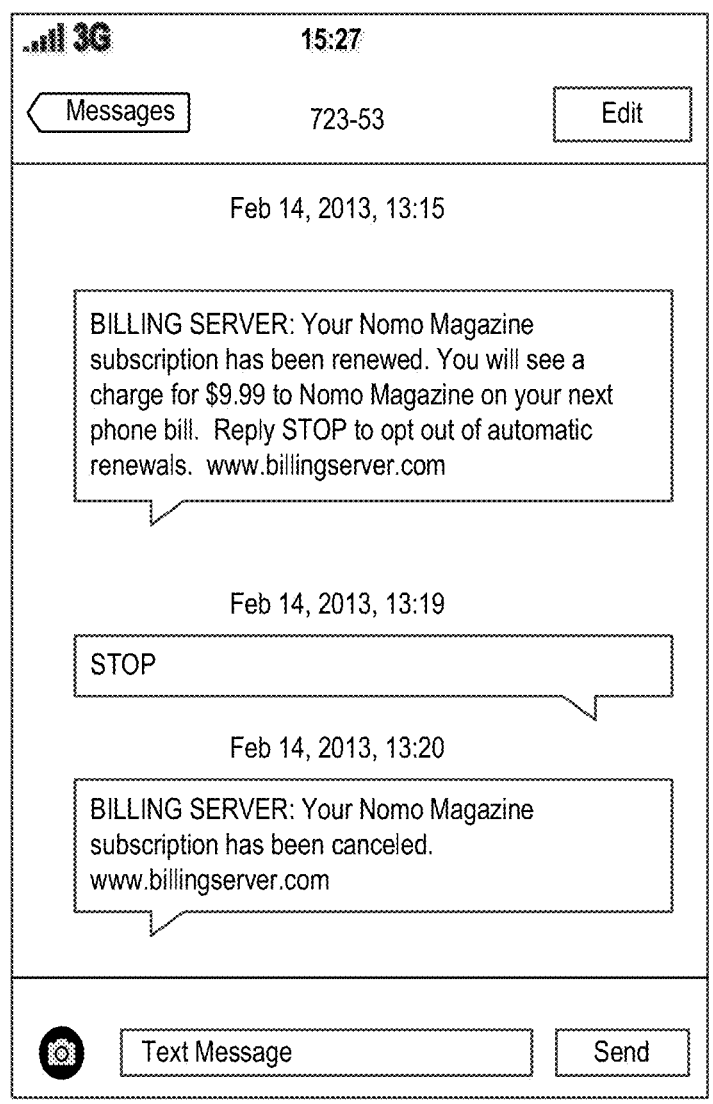
FIG. 31 shows an example of text messages that are exchanged to cancel the subscription as described with reference to FIG. 30.

FIG. 31 shows an example of text messages that are exchanged to cancel the subscription as described with reference to FIG. 30. The text messages received and sent at 650 and 654 in FIG. 30 are both shown as the second and third messages in FIG. 31.

Figure 32:
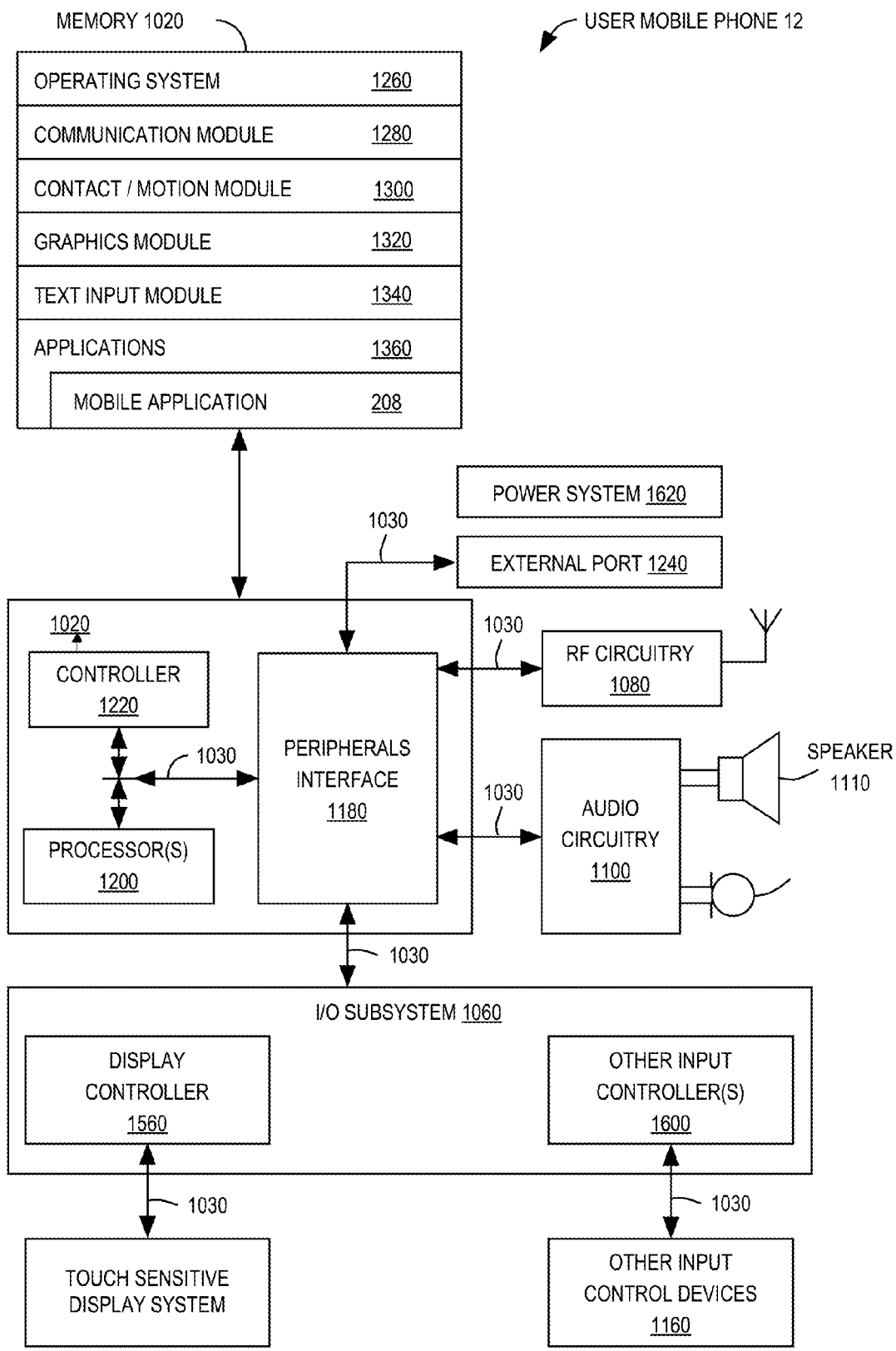
FIG. 32 is a block diagram of the user mobile phone illustrating SmartPhone features thereof.
Figure 33:
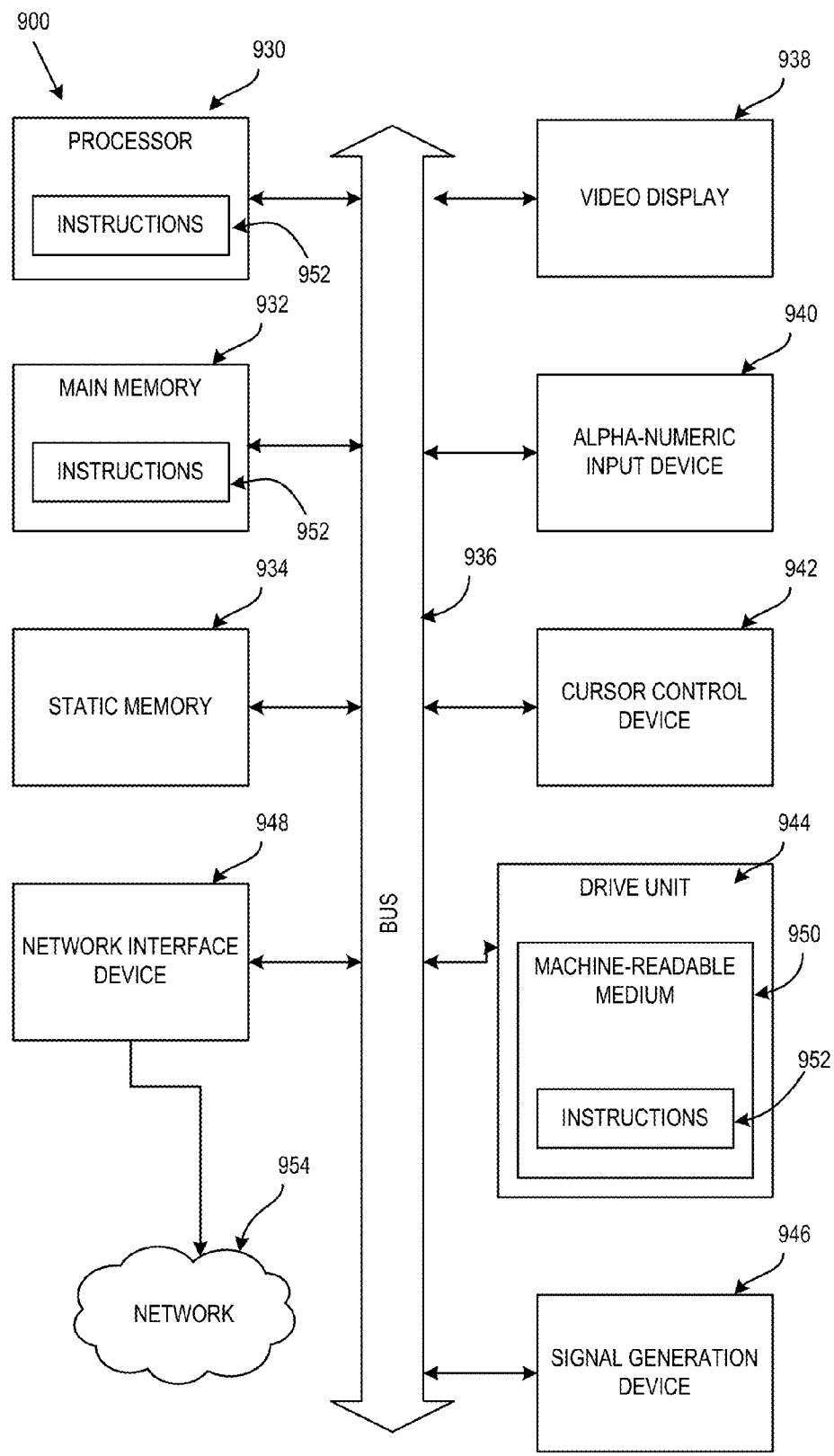
FIG. 33 is a block diagram of a machine in the form of a computer system forming part of the subscription management system.

FIG. 32 is a block diagram of the user mobile phone 12, illustrating a touch-sensitive display 1120 or a "touch screen" for convenience. The user mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 32 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the user mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the user mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the user mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the user mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the user mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The user mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

FIG. 3 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM), etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of processing a sale of a subscription comprising:

storing, with a subscription server, a plurality of codes in a first data store;

establishing, with the subscription server, a connection with a billing server, wherein the subscription server and billing server have separate functionality and are communicatively coupled in a manner to effectively process codes and the billing server is communicatively coupled to a user device of a user such that the billing server is separately coupled with the subscription server and the user device, wherein the functionality of the subscription server includes to at least to mark a code as sent and redeemed and the functionality of the billing server includes at least to mark a code as reserved;

marking, with the subscription server, a subset of the of codes as sent;

transmitting, with the subscription server, the codes that are marked as sent to the billing server, the billing server storing the plurality of codes in a second data store separate from the first data store, receiving a first text message from the user device, the first text message being a request for a code, marking a selected one of the codes in the second data store as reserved, confirming purchase of the code that is marked reserved, and transmitting a second text message to the user device, the second text message including the code that is marked as reserved and a link to a redemption page of a website of the subscription server;

receiving, with the subscription server, a request from the user device when the user selects the link for a redemption page;

transmitting, with the subscription server, the redemption page to the user device, the redemption page having a field for the user to enter the code that has been marked reserved by the billing server in the second data store for transmission to the subscription server;

receiving, with the subscription server, a code entered in to the redemption page from a user device;

processing, with the subscription server, a redemption of the code received from the user device, wherein the redemption of the code includes determining whether the code received from the user device matches any one of the codes marked as sent in the first data store and transmitted to the billing server from the subscription server;

if the code received from the user device matches any one of the codes marked as sent in the first data store and transmitted to the billing server from the subscription server then marking, with the subscription server, the code that is marked as sent in the first data store matching the code received from the user device as redeemed in the first data store and transmitting, with the subscription server, at least one account setup page that includes account creation fields to the user device;

receiving, with the subscription server, account details from the user device that the user has entered into the account creation fields; and storing, with the subscription server, the account details in an account database of the subscription server.

2. The method of claim 1, further comprising:
storing, with the billing server, the plurality of codes in a data store;
receiving, with the billing server, a code request text message from a user device of a user;
marking, with the billing server, a selected one of the codes in the data store as reserved;
confirming, with the billing server, purchase of the code that is marked reserved;
identifying, with the billing server, in response to receiving the code request text message, a carrier server of the user from the first text message;
charging, with the billing server, in response to the confirmation of the purchase of the code, an account at the carrier server that has been identified; and
if the account of the account server has been charged then transmitting, with the billing server, a code redemption text message to the user device, the code redemption text message including the code that is marked as reserved and a link to a redemption page of a website of the subscription server.

3. The method of claim 2, further comprising:
receiving, with the billing server, payment from the account server in response to the charge request; and
transmitting, with the billing server, a payment to the subscription server in response to receiving the payment from the account server.

4. The method of claim 2, wherein the billing server transmits a charge request to the carrier server, the charge request including an amount to be charged to the account of the carrier server.

5. The method of claim 4, further comprising:
receiving, with the billing server, a confirmation from the account server that the account has been charged, wherein the billing server only transmits the second text message if the confirmation has been received.

6. The method of claim 2, wherein the billing server receives the codes from the subscription server before the account has been charged.

7. The method of claim 1, further comprising:
receiving, with the billing server, a phone number of the user, the account at the carrier server being an account identified by the phone number on the carrier server.

8. The method of claim 7, wherein the code request text message includes the phone number.

9. The method of claim 8, wherein the code request text message includes an identification of the carrier server.

10. The method of claim 2, further comprising:
transmitting, with the billing server, an authorization request text message to the user device in response to the code request text message, the authorization request text message requesting an authorization to charge the account; and
receiving, with the billing server, an authorization text message from the user device in response to the authorization request text message, the authorization text message indicating either authorization or not authorization, the charge request only being transmitted if the authorization text message indicates authorization.

11. The method of claim 1, wherein the account details include login information including a user name and a password, further comprising:
receiving, with the subscription server, a login request from the user mobile device, the login request including a user name and password; and
permitting, with the subscription server, access for the user device to subscription content on the subscription server if the user name and password in the login request match the user name and password, respectively, of the login information.

12. The method of claim 1, wherein the account details include a delivery address, further comprising:
printing the delivery address on a label for a magazine; and
mailing the magazine to the delivery address.

13. A non-transitory computer readable medium having stored thereon a set of instructions which, when executed by at least one processor, performs a method of processing a sale of a subscription comprising:
storing, with a subscription server, a plurality of codes in a first data store;
establishing, with the subscription server, a connection with a billing server, wherein the subscription server and billing server have separate functionality and are communicatively coupled in a manner to effectively process codes and the billing server is communicatively coupled to a user device of a user such that the billing server is separately coupled with the subscription server and the user device,
wherein the functionality of the subscription server includes to at least to mark a code as sent and redeemed and the functionality of the billing server includes at least to mark a code as reserved;
marking, with the subscription server, a subset of the of codes as sent;
transmitting, with the subscription server, the codes that are marked as sent to the billing server, the billing server storing the plurality of codes in a second data store separate from the first data store, receiving a first text message from the user device, the first text message being a request for a code, marking a selected one of the codes in the second data store as reserved, confirming purchase of the code that is marked reserved, and transmitting a second text message to the user device, the second text message including the code that is marked as reserved and a link to a redemption page of a website of the subscription server;

receiving, with the subscription server, a request from the user device when the user selects the link for a redemption page;

transmitting, with the subscription server, the redemption page to the user device, the redemption page having a field for the user to enter the code that has been marked reserved by the billing server in the second data store for transmission to the subscription server;

receiving, with the subscription server, a code entered in to the redemption page from a user device;

processing, with the subscription server, a redemption of the code received from the user device, wherein the redemption of the code includes determining whether the code received from the user device matches any one of the codes marked as sent in the first data store and transmitted to the billing server from the subscription server;

if the code received from the user device matches any one of the codes marked as sent in the first data store and transmitted to the billing server from the subscription server then marking, with the subscription server, the code that is marked as sent in the first data store matching the code received from the user device as redeemed in the first data store and transmitting, with the subscription server, at least one account setup page that includes account creation fields to the user device;

receiving, with the subscription server, account details from the user device that the user has entered into the account creation fields; and storing, with the subscription server, the account details in an account database of the subscription server.

14. A subscription server system comprising a subscription server that includes:

a processor;

a computer-readable medium connected to the processor; and a set of instructions on the computer-readable medium being executable by the processor to carry out a method of processing a sale of a subscription comprising:

a code issuing module storing, with a subscription server, a plurality of codes in a first data store, establishing, with the subscription server, a connection with a billing server, wherein the subscription server and billing server have separate functionality and are communicatively coupled in a manner to effectively process codes and the billing server is communicatively coupled to a user device of a user such that the billing server is separately coupled with the subscription server and the user device, wherein the functionality of the subscription server includes to at least to mark a code as sent and redeemed and the functionality of the billing server includes at least to mark a code as reserved, marking, with the subscription server, a subset of the of codes as sent, transmitting, with the subscription server, the codes that are marked as sent to a billing server, the billing server storing the plurality of codes in a second data store separate from the first data store, receiving a first text message from the user device, the first text message being a request for a code, marking a selected one of the codes in the second data store as reserved, confirming purchase of the code that is marked reserved, and transmitting a second text message to the user device, the second text message including the code that is marked as reserved and a link to a redemption page of a website of the subscription server;

a website;

an account database;

a user device interactive module receiving a request from the user device when the user selects the link for a redemption page, and transmitting the redemption page from the mobile website to the user device, the redemption page having a field for the user to enter the code that has been marked reserved by the billing server in the second data store for transmission to the subscription server, and receiving a code entered in to the redemption page from a user device;

a code redemption module processing a redemption of the code received from the user device, wherein the redemption of the code includes determining whether the code received from the user device matches any one of the codes marked as sent in the first data store and transmitted to the billing server from the subscription server, wherein if the code received from the user device matches any one of the codes marked as sent in the first data store and transmitted to the billing server from the subscription server then marking, with the subscription server, the code that is marked as sent in the first data store matching the code received from the user device as redeemed in the first data store and transmitting, with the subscription server, at least one account setup page that includes account creation fields to the user device, receives account details from the user device that the user has entered into the account creation fields and stores the account details in the account database.

15. The subscription system of claim 14, wherein the account details include login information including a user name and a password, the user device interactive module receiving a login request from the user mobile device, the login request including a user name and password, and permitting access for the user device to subscription content on the subscription server if the user name and password in the login request match the user name and password, respectively, of the login information.

16. The subscription system of claim 14, wherein the account details include a delivery address, further comprising:

a printer connected to the subscription server for printing the delivery address on a label for a magazine.

* * * * *